(12) United States Patent
Beeler et al.

(10) Patent No.: US 9,371,593 B2
(45) Date of Patent: Jun. 21, 2016

(54) CURRENT COLLECTOR BAR APPARATUS, SYSTEM, AND METHOD OF USING THE SAME

(71) Applicant: ALCOA INC., Pittsburgh, PA (US)

(72) Inventors: Richard M. Beeler, Saxonburg, PA (US); Leroy E. D'Astolfo, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 177 days.

(21) Appl. No.: 14/022,370

(22) Filed: Sep. 10, 2013

(65) Prior Publication Data

US 2014/0069820 A1 Mar. 13, 2014

Related U.S. Application Data

(60) Provisional application No. 61/699,645, filed on Sep. 11, 2012.

(51) Int. Cl.

| | |
|---|---|
| C25B 9/00 | (2006.01) |
| C25B 11/04 | (2006.01) |
| C25C 7/00 | (2006.01) |
| C25C 3/08 | (2006.01) |
| C25C 3/06 | (2006.01) |
| C25C 3/16 | (2006.01) |

(52) U.S. Cl.
CPC ... *C25C 3/08* (2013.01); *C25C 3/06* (2013.01); *C25C 3/16* (2013.01)

(58) Field of Classification Search
CPC ............ C25B 9/00; C25B 11/04; C25C 3/08; C25C 7/00; C25D 17/007
USPC .......................... 205/372, 374; 204/242, 244
See application file for complete search history.

(56) References Cited

U.S. PATENT DOCUMENTS

| | | | |
|---|---|---|---|
| 2,846,388 A | 8/1958 | Morel | |
| 3,630,880 A * | 12/1971 | Howard et al. | ............... 204/284 |
| 4,110,179 A | 8/1978 | Tschopp | |
| 5,855,758 A | 1/1999 | Mitchell et al. | |

(Continued)

FOREIGN PATENT DOCUMENTS

| | | |
|---|---|---|
| CN | 2079618 | 6/1991 |
| CN | 201031257 | 3/2008 |

(Continued)

OTHER PUBLICATIONS

International Search Report and Written Opinion of the International Searching Authority for International Application No. PCT/US2013/058886, dated Dec. 26, 2013.

(Continued)

*Primary Examiner* — Zulmariam Mendez
(74) *Attorney, Agent, or Firm* — Greenberg Traurig, LLP

(57) ABSTRACT

The instant disclosure provides an electrolysis cell, which includes: an anode; a cathode block; and a current collector bar configured to be at least partially disposed adjacent to and in electrical communication with the cathode block, wherein the bar comprises: at least one sidewall; an inner void enclosed by the sidewall; and an expandable material retained in the inner void via the at least one sidewall, wherein the expandable material is configured to exert pressure on the wall of the inner void while the bar is at operating temperature, such that the bar is conformed to the cathode block.

17 Claims, 19 Drawing Sheets

(56) References Cited

U.S. PATENT DOCUMENTS

| | | |
|---|---|---|
| 5,976,333 A | 11/1999 | Pate |
| 6,113,756 A | 9/2000 | Juric |
| 6,231,745 B1 | 5/2001 | Homley et al. |
| 6,387,237 B1 | 5/2002 | Homley et al. |
| 7,776,190 B2 | 8/2010 | Hiltmann et al. |
| 7,776,191 B2 | 8/2010 | Hiltmann et al. |
| 8,500,970 B2 | 8/2013 | Allano et al. |

FOREIGN PATENT DOCUMENTS

| | | | | |
|---|---|---|---|---|
| WO | WO 95/34696 | * 12/1995 | ................ | C25C 3/16 |
| WO | 01/27353 | 4/2001 | | |
| WO | 2013/016930 | 2/2013 | | |

OTHER PUBLICATIONS

State Intellectual Property Office of the People's Republic of China Search Report, dated Sep. 6, 2015.

European Search Report dated Feb. 22, 2016 from corresponding European Application No. 13837115.8.

\* cited by examiner

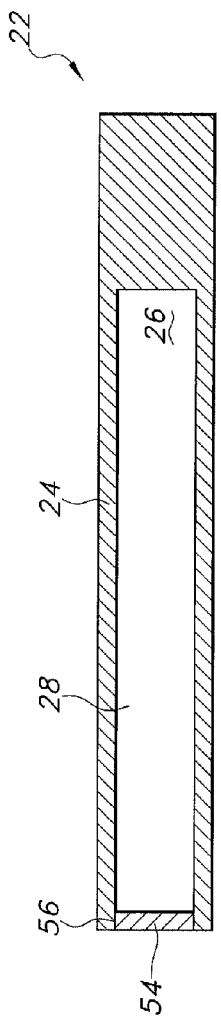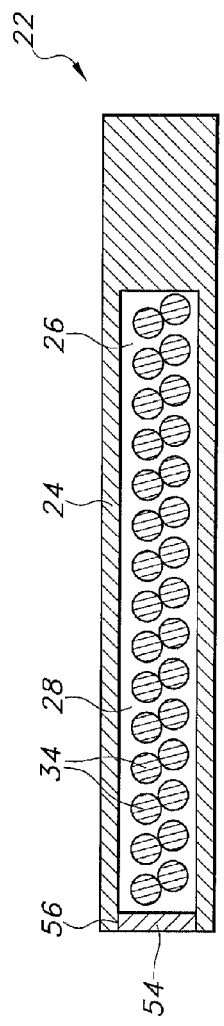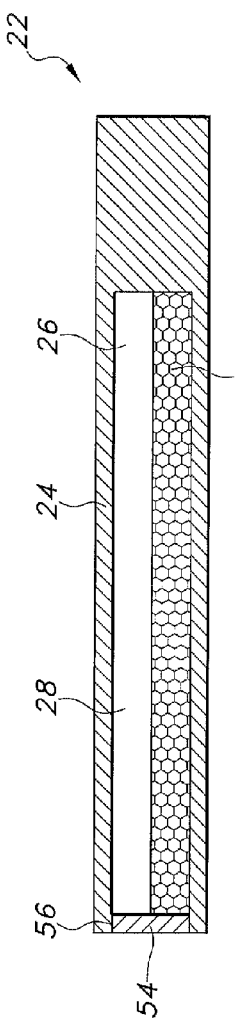

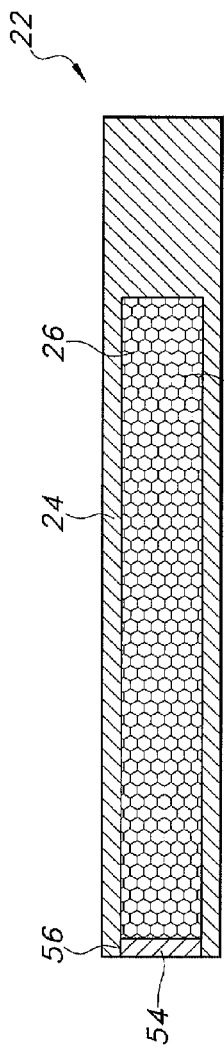# 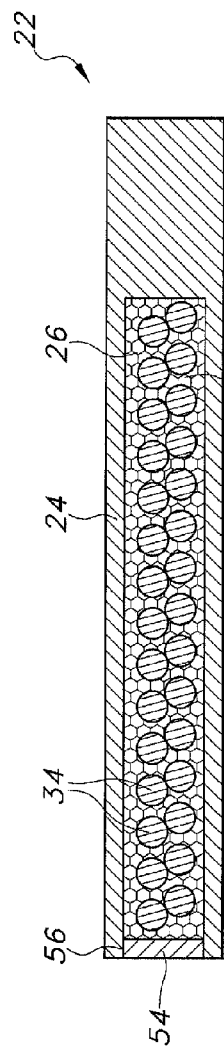 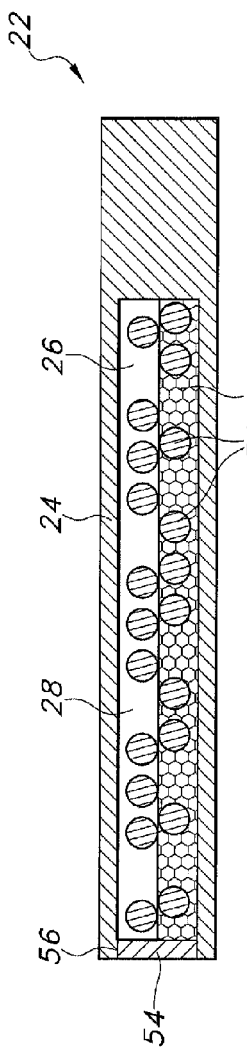

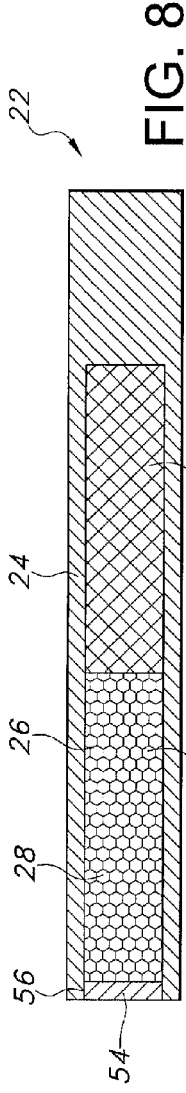
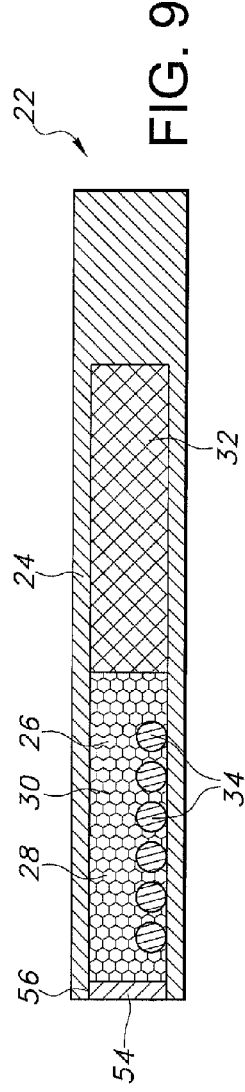
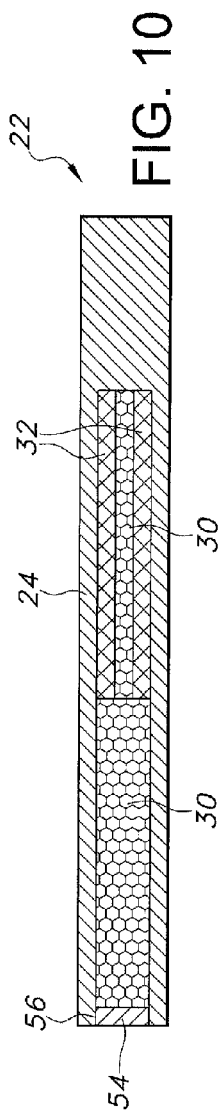
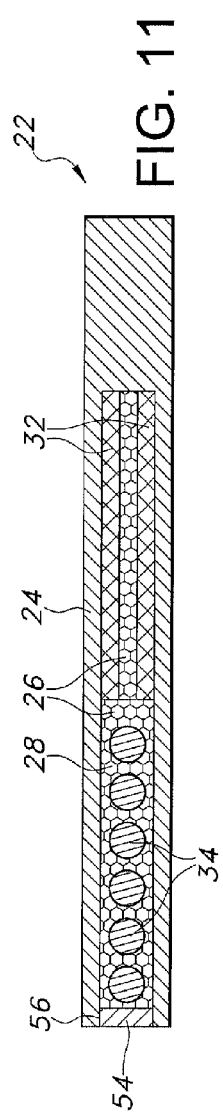
FIG. 8
FIG. 9
FIG. 10
FIG. 11

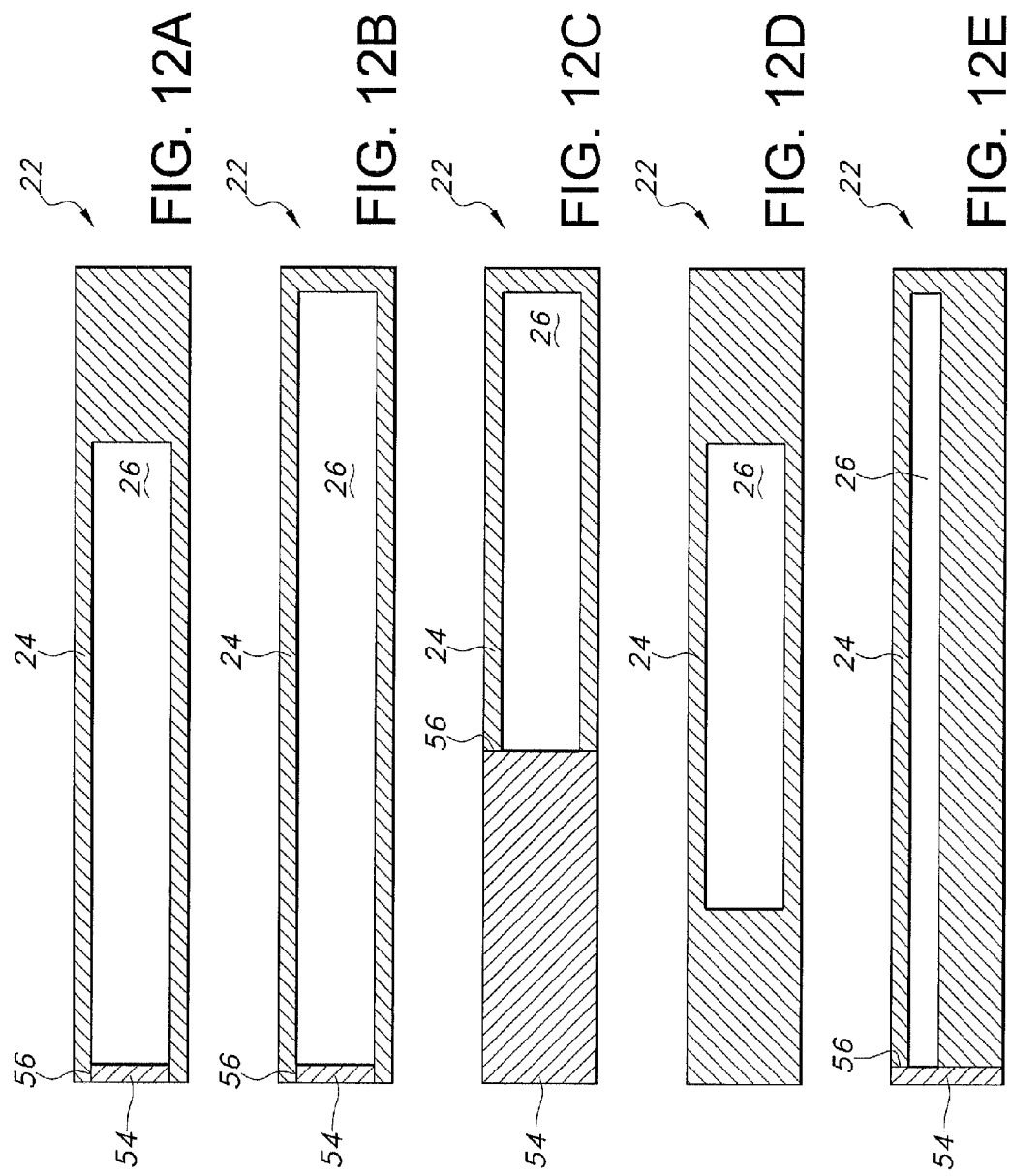

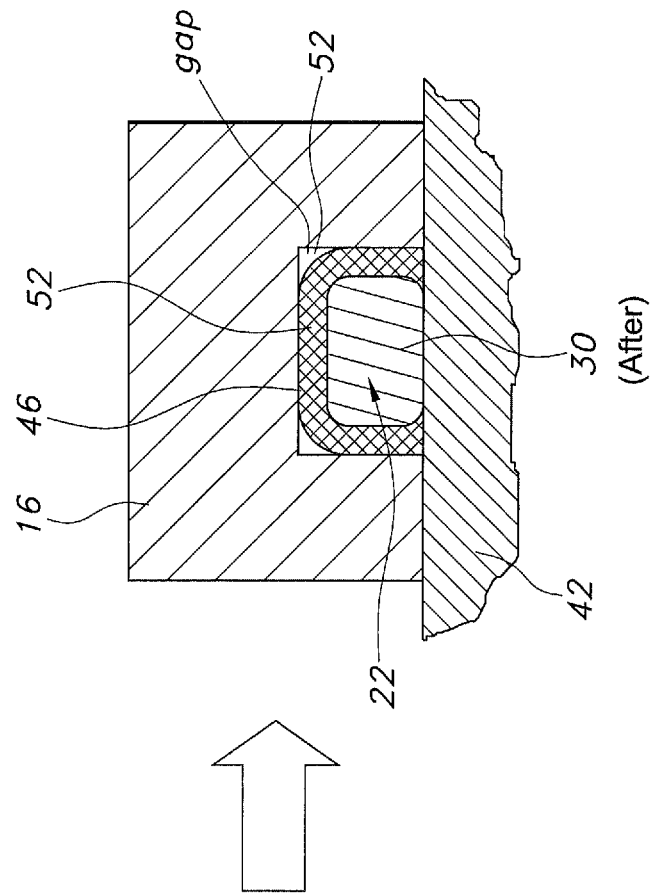
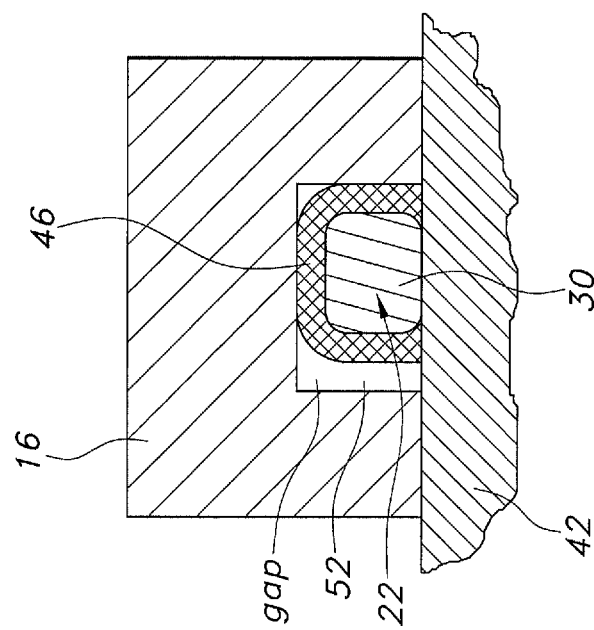
FIG. 13B (After)
FIG. 13A (Before)

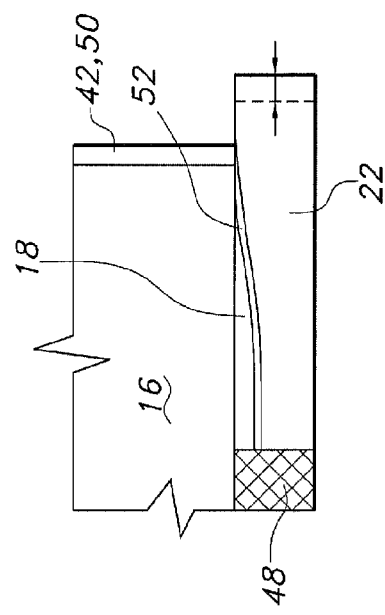
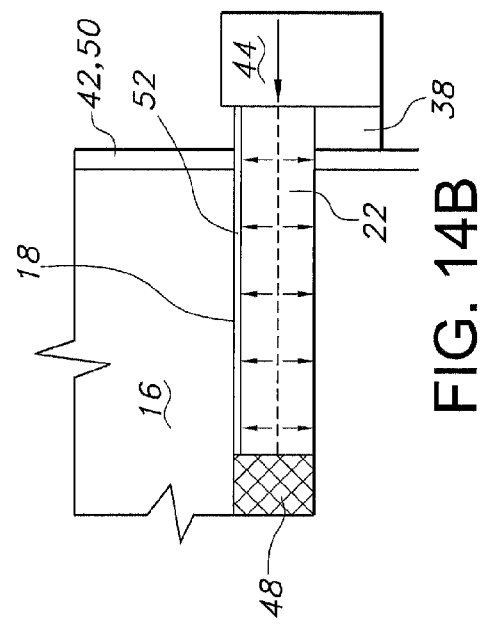
FIG. 14A
FIG. 14B

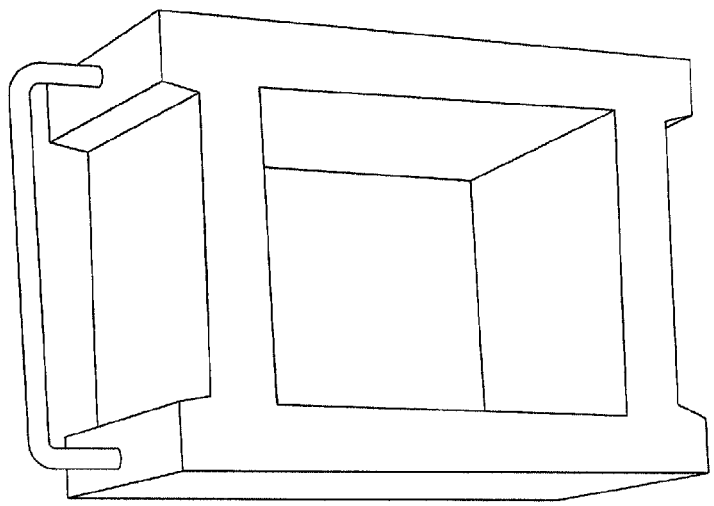
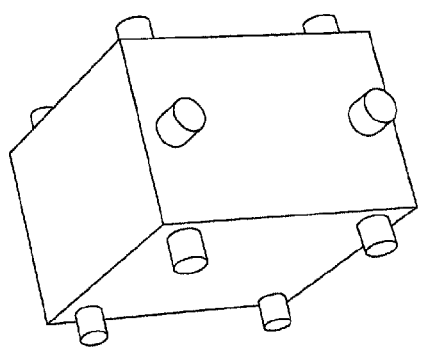
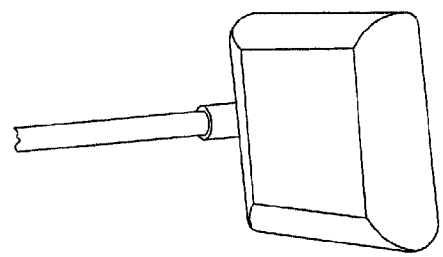
FIG. 25

CURRENT COLLECTOR BAR APPARATUS, SYSTEM, AND METHOD OF USING THE SAME

CROSS-REFERENCE TO RELATED APPLICATIONS

This application claims priority to U.S. Application Ser. No. 61/699,645, entitled "Adjustable Current Collector Bar and Method of Using the Same" filed on Sep. 11, 2012, which is incorporated by reference in its entirety.

FIELD OF THE INVENTION

Broadly, the present disclosure relates to systems and methods for producing aluminum in electrolytic cells, while simultaneously reducing CVD and/or maintaining a low CVD. More particularly, the instant disclosure relates to utilizing a current collector bar in conjunction an expandable material in an inner void which expands as temperature increases (e.g. during pre-heat and during cell operation) to reduce voltage drop between the collector bar and the cathode (e.g. cathode block) during operation of the electrolysis cell.

BACKGROUND

During conventional aluminum production, electricity is supplied to the electrolytic cell in order to drive the production of aluminum. Voltage is lost in the cell due to inefficiencies in the design, particularly in the electrical contact sites as the electrical current from the cell is transferred out of the system. This loss of voltage is commonly known as cathode voltage drop, or "CVD". Poor contact caused during the cathode assembly formation, cell start up, and/or through the continued operation of the cell at extreme conditions (e.g. high temperatures) contributes to CVD. The cost of voltage loss from CVD in operating electrolysis cells can add up to millions of dollars per year, per plant.

SUMMARY OF THE DISCLOSURE

Broadly, the present disclosure relates to systems and methods for producing non-ferrous metal (e.g. aluminum) in electrolytic cells, while simultaneously reducing CVD. More particularly, the instant disclosure relates to utilizing an adjustable (expandable) current collector bar in conjunction with an electrolysis cell. In some embodiments, by expanding the inner void of the current collector bar, it is possible to maintain and/or improve the contact (e.g. electrical contact) between various electrolysis cell components (e.g. the cathode collector bar(s) and the cathode). In some embodiments, the expandable current collector bar improves contact between cathode assembly subcomponents, reducing joint electrical resistance (i.e. electrical resistance across the joint of at least two components), thus resulting in a reduction in CVD in the cell.

In one aspect of the instant disclosure, an electrolysis cell is provided, comprising: an anode; at least one cathode block; and a current collector bar configured to be at least partially disposed adjacent to and in electrical communication with the cathode block, wherein the current collector bar comprises: at least one sidewall; an inner void enclosed by the sidewall; and an expandable material retained in the inner void via the at least one sidewall, wherein the expandable material is configured to exert pressure on the wall of the inner void while the collector bar is at operating temperature, such that the collector bar is conformed to the cathode block.

In one aspect of the instant disclosure, a current collector bar is provided, comprising: at least one sidewall which is configured to completely enclose an inner void; and an expandable material retained in the inner void via the at least one sidewall, wherein the expandable material is configured to exert pressure on the wall of the inner void while the collector bar is at a temperature of at least about 200° C., such that the at least one sidewall is deformed via the pressure exerted on the wall of the inner void.

In some embodiments, the adjustable current collector bar promotes contact between the slot of the cathode block and the current collector subassembly (e.g. current collector bar, and in some embodiments, sheath/cover/joint of conductive material). In one embodiment, the current collector bar is configured to impart force (or pressure) onto the cathode (e.g. slot).

In one embodiment, as the collector bar pressurizes, it presses/conforms against the cathode (e.g. in an transverse direction), as it expands in a transverse direction, against, and into contact with the surface of the slot. In one embodiment, as the bar expands transversely, it conforms itself to the surface of the slot. Thus, in some embodiments, the bar increases the surface area of contact (and reduces the electrical resistance) across the current collector subassembly (i.e. between itself and the slot of the cathode block). In one embodiment, as the amount of shared surface area between the block and bar increases, the electrical resistance at the joint decreases. Thus, in some embodiments, the adjustable (pressurizable) current collector bar reduces CVD in the electrolysis cell.

Joint resistance in the cathode assembly may be attributed to one or more mechanisms and/or sources. Some non-limiting examples of sources of joint resistance in the cathode assembly include: creep, phase change, spacer standoff, voids, non-conforming surfaces, and combinations thereof. In various embodiments, voids, phase changes, and creep occur respectively before, during, and after the startup of a pot (cell). In some embodiments, a resulting surface non-conformity between the bar and slot has components that develop in each of these phases. The instant disclosure prevents, reduces and/or eliminates joint resistivity (i.e. high electrical resistance) by utilizing an adjustable cathode collector bar (e.g. pressurizable) to apply stress to the components of the cathode assembly, thus conforming the cathode collector bar subassembly. In some embodiments, the bar applies stress to the cathode slot while the cell is cold, during start up, or at operating conditions (e.g. high temperature and pressure) and promotes bar deformation (e.g. creep) to the cathode block slot in a way that the joint mechanical conformity and electrical connection is improved during operation of the cell at operating conditions (e.g. elevated temperatures).

In some embodiments, the inner void expands and imparts pressure on the current collector bar, which expands/compresses into the slot (e.g. imparts force) on the current collector subassembly when: (1) the cell is idle; (2) during start-up; (3) during operating conditions, and/or (4) combinations thereof. In one or more of these embodiments, the adjustable collector bar imparts a continuous amount of force on the cathode. In one or more embodiments, the bar imparts a variable amount of force on the cathode (e.g. based on a feedback loop). Thus, in one or more embodiments, the collector bar: prevents an increase in CVD, reduces CVD, and/or maintains low levels of CVD across a cathode assembly. In some embodiments, the joint's contribution to CVD (i.e. the cathode collector subassembly/cathode slot joint) is eliminated.

In one embodiment, the expandable material therein selected from the group consisting of: a gas, an inert gas, a phase change material, $MgCO_3$, $CaCO_3$, $Na_2CO_3$, carbonates, sulfates, a degrading material, a decomposing material and combinations thereof.

In some embodiments, the expandable material expands at a temperature of: at least about 100° C.; at least about 150° C.; at least about 200° C.; at least about 250° C.; at least about 300° C.; at least about 350° C.; at least about 400° C.; at least about 500° C.; at least about 550° C.; at least about 600° C.; at least about 650° C.; at least about 700° C.; at least about 750° C.; at least about 800° C.; at least about 850° C.; at least about 900° C.; at least about 950° C.; at least about 1000° C.; or greater.

In some embodiments, the expandable material expands at a temperature of: not greater than about 100° C.; not greater than about 150° C.; not greater than about 200° C.; not greater than about 250° C.; not greater than about 300° C.; not greater than about 350° C.; not greater than about 400° C.; not greater than about 500° C.; not greater than about 550° C.; not greater than about 600° C.; not greater than about 650° C.; not greater than about 700° C.; not greater than about 750° C.; not greater than about 800° C.; not greater than about 850° C.; not greater than about 900° C.; not greater than about 950° C.; not greater than about 1000° C.; or greater.

In one embodiment, the expandable material undergoes a phase change at a temperature exceeding about 100° C. In one embodiment, the expandable material undergoes a volumetric expansion as approximately described by the ideal gas law.

In some embodiments, the expandable material comprises: a gas. In some embodiments, the expandable material comprises a gas which evolves from a solid material. In some embodiments, the collector bar further comprises a container which is configured to retain a gas and release said gas at a predetermined temperature. In some embodiments, the container houses a pressurized gas, which is released when the container reaches a certain temperature (e.g. container melts or container has a vent built in which releases the gas once the pressure reaches a certain predetermined level.)

In some embodiments, the expandable material is configured to expand during heat-up of the cell. In some embodiments, the expandable material is configured to expand during operation of the cell. In some embodiments, the internal pressure of the collector bar is increased by the expansion of the expandable material in the inner void. In some embodiments, the internal pressure of the collector bar is maintained by the seal of the collector bar. In some embodiments, the pressure of the inner cavity of the collector bar is increased by about a factor of 5 during preheat. In some embodiments, the pressure of the inner cavity of the collector bar is increased by about a factor of 5 during operation of the cell. In some embodiments, the inner void is sealed by the at least one sidewall so that the gas retained in the inner void does not escape from the collector bar. In some embodiments, the collector bar does not have a vent. In some embodiments, the collector bar is not opened to the atmosphere to vent and/or reduce pressure inside the system.

In some embodiments the pressure increase in the inner void of the collector bar is maintained even with subsequent expansion and/or deformation of the collector bar.

In one embodiment the void comprises a filler material (e.g. which is non-reactive and which does not undergo an expansion).

In some embodiments, the void comprises a conductive material. In some embodiments, the conductive material comprises a greater electrical conductivity than the at least one sidewall (e.g. copper and copper alloys). In some embodiments, the conductive material comprises a bar, a plate, a rod, a pipe (e.g. with a central via), a plurality of tabs, a plurality of shot material, and combinations thereof.

In one embodiment, the cell includes an anchor in communication with and end of the current collector bar, where the anchor is configured to limit movement of the current collector bar in a longitudinal direction (e.g. out of the cell). In some embodiments, the anchor comprises a rigid support which includes a mechanical fastener (e.g. bolt) which retains the collector bar in position (i.e. before the expandable material increases the pressure on the wall of the inner void). In some embodiments, the anchor comprises a stepped configuration of the cathode collector bar, which, with cooperation with the outer shell, anchors the collector bar in position in the cathode collector subassembly.

In one embodiment, the expandable materials are configured to increase the pressure in the inner void by at least about 50 psig at cell operating conditions.

In one embodiment, the inner void comprises a pressure of at least about 15 PSIG at a temperature of 20-25° C. (e.g. pre-pressurized).

In one embodiment, the adjustable current collector bar reduces the cathode voltage drop between the cathode and the current collector bar by at least about 50 mV.

In one embodiment, the transverse cross-sectional area percentage of the inner void to the collector bar is at least about 10%. In one embodiment, the transverse cross-sectional area percentage of the inner void to the collector bar is not greater than about 90%.

In one embodiment, the pressure in the inner void exerts force on the sidewall of the bar. In one embodiment, the current collector bar imparts force onto the at least one sidewall of the bar to transversely expand the sidewalls against the cathode block, maintaining the interface between the current collector bar and the cathode block.

In one embodiment, the collector bar further comprises: a joint material composed of a conductive material, located between and in electrical communication with the cathode and the current collector bar. In some embodiments, the joint material comprises copper. In some embodiments, the joint material comprises cast iron. In some embodiments, the joint material comprises paste (e.g. conductive material).

In one embodiment, the apparatus further comprises: an expansion detector in communication with the adjustable conductor bar and configured to measure the expansion of the bar.

In another aspect of the instant disclosure, a method is provided. The method of making a primary metal (e.g. aluminum) comprises: (a) transmitting an electrical current from an anode to a cathode assembly, via a liquid medium at a temperature of at least about 800° C., wherein the cathode assembly comprises: a cathode block, in electrical communication with at least one of the liquid medium and a metal pad (produced via electrolysis) and an adjustable current collector bar, adjacent to and in electrical communication with the cathode, the adjustable current collector bar comprising: at least one sidewall enclosing an inner void having an expandable material therein, wherein the expandable material is configured to expand at a temperature exceeding about 800° C.; (b) transversely expanding the sidewall of the current collector bar, via an increase in pressure of the inner void, due to the expansion of the expandable material, and c) maintaining, due to the expansion step, contact between the slot of the cathode block and the current collector subassembly.

In one embodiment, the expanding/conforming step (e.g. compressing the sidewall of the current collector bar into the slot or interface of the cathode block) is sufficient to effect a reduction in a cathode voltage drop across the cathode assembly of at least about 50 mV.

In one embodiment, the expanding/conforming step further comprises: conforming the current collector bar to the cathode to reduce the electrical resistance.

In one embodiment, the expanding/conforming step further comprises conforming the current collector subassembly to the cathode block to reduce the cathode voltage drop (CVD) from about 10 mV to about 100 mV.

In one embodiment, the method further includes the step of: determining the force imparted by the current collector bar via the expansion detector (sensor).

In some embodiments, the bar includes an inner void with an expandable material. In one embodiment, in order to impart force, the adjustable bar is pressurized into place into a cathode (e.g. at the slot). In some embodiments, the at least one sidewall of the bar is conformed to the cathode based on the based upon the pressure inside the bar and/or the temperature of the bar/cell components. In one embodiment, the adjustable bar is a metal material (e.g. metallic). In some embodiments, the bar is: a carbon steel, a ferritic/magnetic material, and combinations thereof. Non-limiting examples of the aforementioned materials include: 430, 410, and 409. Some non-limiting examples of bar materials include: carbon steel, stainless steel (e.g. 304, 304L), and steel. In one embodiment, the bar includes at least one wall that seals in an inner void. In various embodiments, the bar is of different shapes, including rectangular, oval, circular, and the like. As some non-limiting examples, the dimension of the bar includes: a rectangular shape, a square shape, a polygonal shape, an oval shape, and/or a rounded shape. In some embodiments, the bar comprises corners. In some embodiments, the bar comprises rounded edges.

In one aspect of the instant disclosure, an aluminum electrolysis cell is provided. The aluminum electrolysis cell, comprises: an anode (an anode configured to provide an electrical current to the electrolysis cell); a cathode (configured to receive the electrical current); and an adjustable current collector bar is at least partially disposed adjacent to and in electrical communication with the cathode, wherein the adjustable current collector bar comprises: at least one sidewall, an inner void enclosed by the sidewall, and an expandable material retained in the inner void via the at least one sidewall, wherein the expandable material is configured to expand during heat up of the cell (e.g. at cell operating conditions of at least about 800° C.) such that the internal pressure of the inner void increases by a factor of about 5 to exert a compressive force onto the at least one sidewall of the collector bar, to conform (e.g. transversely expand) the collector bar to the cathode. In some embodiments, the sidewall comprises a conductive material. In some embodiments, the sidewall comprises steel, cast iron, carbon, or the like.

In yet another aspect of the invention, a method of making an adjustable bar is provided. The method comprises: forming at least one sidewall around an inner void to provide a metallic body having an opening; inserting an expandable material into the void via the opening (e.g. pre-pressurized void with gas); closing the metallic body, thus completely enclosing the void having an expandable material therein.

In another aspect, a method of making an expandable member is provided. The method comprises: aligning a plurality of (at least two) metallic walls to provide a void therein; and sealing the plurality of walls.

In one embodiment, the bar is cast from a mold. In one embodiment, the bar is extruded to form. In one embodiment, the bar is machined. In one embodiment, the bar is rolled. In one embodiment, the bar portions (e.g. sides) are adhered together. In one embodiment, the bar is welded together (e.g. to retain the material). In one embodiment, the bar is screwed together (e.g. to retain the material). In one embodiment, the bar is bolted together (e.g. to retain the material). In one embodiment, the expandable member is mechanically fastened together (e.g. to retain the material).

In one embodiment, the method comprises inserting a material (e.g. gas, expandable material, filler material) into the void (sometimes called an inner void or central region).

In one embodiment, closing includes sealing the bar with material in the inner void.

In some non-limiting embodiments, sealing includes: welding, mechanically fastening, adhering, riveting, bolting, screwing, and the like.

In some embodiments, the wall of the bar is thick enough to be capable of efficiently removing current from the cell (i.e. transport current from the cathode and/or metal pad to the electrical bus work).

In some embodiments, the wall of the bar is thin enough to be capable of deforming to conform to the cathode (e.g. as the bar is pressurized and/or increases in temperature to operating conditions of at least about 850° C.).

In one embodiment, the percentage of the transverse cross-sectional area of the void to the total bar (bar body plus void) is: at least about 10%; at least about 15%; at least about 20%; at least about 25%; at least about 30%; at least about 35%, at least about 40%; at least about 45%; at least about 50%; at least about 55%; at least about 60%; at least about 65%; at least about 70%; at least about 75%; at least about 80%; at least about 85%; or up to 90%.

In one embodiment, the percentage of the transverse cross-sectional area of the void to the total bar (bar body plus void) is: not greater than about 10%; not greater than about 15%; not greater than about 20%; not greater than about 25%; not greater than about 30%; not greater than about 35%, not greater than about 40%; not greater than about 45%; not greater than about 50%; not greater than about 55%; not greater than about 60%; not greater than about 65%; not greater than about 70%; not greater than about 75%; not greater than about 80%; not greater than about 85%; or up to 90%.

In some embodiments, the thickness of the wall(s) varies. In some embodiments, the wall thickness is continuous throughout. In some embodiments, the wall is: at least about 1/16" thick; at least about 1/8" thick; at least about 1/4" thick; at least about 1/2" thick; at least about 3/4" thick; at least about 1" thick; at least about 1.5" thick; at least about 2" thick; at least about 2.5" thick; or at least about 3" thick.

In some embodiments, the wall is: not greater than about 1/16" thick; not greater than about 1/8" thick; not greater than about 1/4" thick; not greater than about 1/2" thick; not greater than about 3/4" thick; not greater than about 1" thick; not greater than 1.5" thick; not greater than about 2" thick; not greater than 2.5" thick; or not greater than about 3" thick.

In some embodiments, the cross-section of the inner void within the bar is square. In some embodiments, the cross-section of the inner void within the bar is rectangular. In some embodiments, the cross-section of the inner void within the bar is I-shaped. In some embodiments, the cross-section of the inner void within the bar is T-shaped.

In some embodiments, the void is filled with air (e.g. of atmospheric composition). In some embodiments, the void comprises a gas (e.g. pure or mixed composition). In some embodiments, the void comprises a filler material (e.g. non-reactive at elevated temperatures (e.g. above 100° C.). In some embodiments, the filler material is a solid non-reactive material which does not expand significantly (e.g. substantially inert) at temperatures exceeding about 100° C. In some embodiments, the void comprises gas at a pressure (e.g. above atmospheric pressure). In some embodiments, the void comprises combinations of at least two of: air (e.g. of atmospheric composition), a gas (e.g. pure or mixed composition), an expandable material, and/or an inert material (i.e. filler material). In some embodiments, the void comprises gas at a pressure (e.g. above atmospheric pressure). In some embodiments, the void comprises an expandable material. In some embodiments, the void comprises combinations thereof.

In some embodiments, the inner void takes up a portion of the volume of the bar. In some embodiments, the inner void is: at least about 5% by vol.; at least about 10% by vol.; at least about 15% by vol.; at least about 20% by vol.; at least about 25% by vol.; at least about 30% by vol.; at least about 35% by vol.; at least about 40% by vol.; at least about 45% by vol.; at least about 50% by vol.; at least about 55% by vol.; at least about 60% by vol.; at least about 65% by vol.; at least about 80% by vol.; at least about 85% by vol.; at least about 90% by vol.; at least about 95% by vol.; or at least about 98% by volume of the bar.

In some embodiments, the inner void is: not greater than about 5% by vol.; not greater than about 10% by vol.; not greater than about 15% by vol.; not greater than about 20% by vol.; not greater than about 25% by vol.; not greater than about 30% by vol.; not greater than about 35% by vol.; not greater than about 40% by vol.; not greater than about 45% by vol.; not greater than about 50% by vol.; not greater than about 55% by vol.; not greater than about 60% by vol.; not greater than about 65% by vol.; not greater than about 80% by vol.; not greater than about 85% by vol.; not greater than about 90% by vol.; not greater than about 95% by vol.; or not greater than about 98% by volume of the bar.

As used herein, adjustable bar refers to an object that expands or enlarges under different conditions (e.g. adjusts). As non-limiting examples, the expansion and/or increase in pressure is attributable to phase change, decomposition, and/or density change upon different temperature or pressure conditions. In one non-limiting example, the bar's internal pressure increases at increased temperature. As another example, at the increased temperature, the inner expandable material undergoes a phase change (i.e. solid to gas) to increase volume at the increased temperature.

In some embodiments, gas (air) having an atmospheric composition is present inside the bar and upon temperature elevation; at least some oxygen ($O_2$) present in the air is removed from the system (e.g. rusts) so that the pressure inside the void at elevated temperature (e.g. 900° C.) is about 3.2 ATM. In some embodiments, the pressure inside the bar (e.g. in the void) drops as the bar expands, so in these embodiments, the expandable material is selected in order to create the appropriate amount of material expansion (e.g. pressure increase) to drive creep. In some embodiments, there is a reduction in the inner pressure due to loss of oxygen (e.g. surface reactions with the bar, like rust) and subsequent volume increase of the bar (e.g. metal expansion).

Non-limiting examples of expandable materials include: $MgCO_3$ (decomposes at 350° C.); $CaCO_3$ (Calcite, decomposes at 898° C.), or $CaCO_3$ (aragonite, decomposes at 825° C., where each of these materials releases carbon dioxide gas at elevated temperatures, and which might be used separately or in combination. Other non-limiting examples of expandable materials include any chemical that degrades at elevated temperatures; for example, temperatures exceeding about 800° C. (e.g. cell operating temperature, at least about 900° C., or at least about 930° C.).

In some embodiments, the expandable material is a pressurized gas, in a secondary container inserted in the bar during assembly. In some embodiments, the secondary container is configured or adapted to melt, and/or leak (e.g. at elevated temperatures of at least about 100° C.), releasing the pressurized gas into the cavity inside the bar.

In some embodiments, at elevated temperature and pressure conditions inside the bar, the gas and/or expandable material inside the bar expand to pressure the bar and push the walls outward. In some embodiments, the rise from ambient temperature to cell operating temperature (e.g. 900° C.-930° C.) increases the internal absolute pressure by a factor of 4 inside the bar.

In another embodiment, a filler material (e.g. inert material) is used inside the bar. In one embodiment, the filler material is porous and/or particulate. As non-limiting examples, the filler material includes tabular alumina, gravel, aggregate, ceramic materials, and the like, which fill a portion of, or the entirety of, the cavity. In some embodiments, by utilizing a filler material, the size of the cavity could be large, while the amount of gas providing the pressure (i.e. the volume that is not occupied by inert material) would be small. With such an embodiment, it is possible to limit creep in the bar, (which would slow as the cavity expanded and pressure dropped). Also, with such an embodiment, the amount of gas that could potentially erupt from the bar during the pot operation is reduced, as compared to an embodiment in which the entire void was filled with gas.

In some embodiments, the improved contact at the interface of the slot and the bar is measureable, correlated, and/or quantified by one or more characteristics. As non-limiting examples, the bar causes a decrease in electrical resistance, an increase in surface area (between the cathode block slot and the cathode current subassembly, a dimensional change in the current collector subassembly (e.g. the amount of collector bar that extends from the cell), and combinations thereof.

When measuring the improved contact by a decreased electrical resistance, the resulting interface comprises a common surface area sufficient to reduce a measured cathode voltage drop in the electrolysis cell by a measureable amount.

In some embodiments, the resulting, improved contact at the interface comprises a common surface area sufficient to reduce a measured cathode voltage drop (e.g. across the cathode assembly) by: at least about 10 mV; at least about 20 mV; at least about 30 mV; at least about 40 mV; at least about 50 mV; at least about 60 mV; at least about 70 mV; at least about 80 mV; at least about 90 mV; 100 mV; at least about 120 mV; at least about 140 mV; or at least about 160 mV.

In some embodiments, the resulting, improved contact at the interface comprises a common surface area sufficient to reduce a measured cathode voltage drop (e.g. across the cathode assembly) by: not greater than about 10 mV; not greater than about 20 mV; not greater than about 30 mV; not greater than about 40 mV; not greater than about 50 mV; not greater than about 60 mV; not greater than about 70 mV; not greater than about 80 mV; not greater than about 90 mV; 100 mV; not greater than about 120 mV; not greater than about 140 mV; or not greater than about 160 mV.

In some embodiments, the electrical resistance at the joint is reduced by a factor of: at least about 3; at least about 5; at least about 10; at least about 20; at least about 40; at least about 60; at least about 80; or at least about 100.

In some embodiments, the electrical resistance at the joint is reduced by a factor of: not greater than about 3; not greater than about 5; not greater than about 10; not greater than about 20; not greater than about 40; not greater than about 60; not greater than about 80; or not greater than about 100.

In some embodiments, when measuring the improved contact by an increased surface area at the joint or interface between the cathode block and the current collector subassembly (or alternatively, joint material/cathode block slot), the improvement is measured as an increase in surface area. This is generally depicted, by comparing: (a) FIG. 8A with FIG. 8B, (b) FIG. 9A with FIG. 9B; (c) FIG. 10A with FIG. 10B; and/or (d) FIG. 10C with FIG. 10D.

In some embodiments, the bar increases the amount of contact (or common surface area) by: at least about 2%; at least about 4%; at least about 6%; at least about 8%; at least about 10%; at least about 15%; at least about 20%; at least about 40%; at least about 50%; at least about 75%; or at least about 100% (e.g. when no contact existed before the bar was pressurized and/or expanded to confirm to the slot.

In some embodiments, the bar increases the amount of contact (or common surface area) by: not greater than about 2%; not greater than about 4%; not greater than about 6%; not greater than about 8%; not greater than about 10%; not greater than about 15%; not greater than about 20%; not greater than about 40%; not greater than about 50%; not greater than about 75%; or not greater than about 100%.

In some embodiments, when measuring the improved contact by a dimensional change in the current collector bar while the bar is under stress, the improved contact at the interface between the cathode block and the current collector bar is measured by the difference in dimension and/or length (e.g. along a longitudinal direction) of the collector bar as it protrudes from the wall of the electrolysis cell.

In some embodiments, as the bar is compressed longitudinally, the bar expands (i.e. increases) in width or height or both (e.g. along a transverse direction) to align in better contact with the surface area of the slot. In some embodiments, the bar exhibits a decrease in length along a longitudinal direction and an increase in width along a transverse direction.

In some embodiments, the improvement in electrical contact refers to an increase in the transverse dimension by: at least about 0.1%; at least about 0.3%; at least about 0.5%; at least about 0.7%; at least about 1%; at least about 1.1%; at least about 1.3%; at least about 1.5%; at least about 1.7%; at least about 2%; or at least about 2.5%.

In some embodiments, the improvement in electrical contact refers to an increase in the transverse dimension by: not greater than about 0.1%; not greater than about 0.3%; not greater than about 0.5%; not greater than about 0.7%; not greater than about 1%; not greater than about 1.1%; not greater than about 1.3%; not greater than about 1.5%; not greater than about 1.7%; not greater than about 2%; or not greater than about 2.5%.

In one embodiment, the improved contact at the interface is measured by a dimensional change of the bar under stress by not greater than 10% in a longitudinal direction (i.e. length) and not greater than 5% in a transverse direction (i.e. width).

In some embodiments, the inner void imparts pressure on the bar, resulting in compressive stress of the at least one sidewall of the bar into/onto the cathode block in various amounts, including: at least about 50 psi; at least about 100 psi; at least about 150 psi; at least about 200 psi; at least about 250 psi; or at least about 300 psi.

In some embodiments, the inner void of the bar expands to compress the sidewall of the bar onto the surface of the cathode block (e.g. slot) in various amounts, including: not greater than about 50 psi; not greater than about 100 psi; not greater than about 150 psi; not greater than about 200 psi; not greater than about 250 psi; or not greater than 300 psi.

In some embodiments, the amount of force applied by the bar to the cathode is large enough for the prevention, reduction, or elimination of gaps between the current collector bar and the cathode block. In some embodiments, by eliminating, reducing, and/or preventing the gap, the adjustable current collector bar reduces CVD across the aluminum electrolysis cell and increases efficient removal of electric current from the system.

In some embodiments, the bar imparts a resulting strain in a longitudinal axial direction of: at least about −0.01%; at least about −0.02%; at least about −0.03%; at least about −0.04%/at least about −0.05%; at least about −0.06%; at least about −0.07%; at least about −0.08%; at least about −0.09%; at least about −0.1%. In some embodiments, the bar imparts a strain in the longitudinal (axial) direction of: at least about −0.1%; at least about −0.15%; at least about −0.2%; at least about −0.25%; at least about −0.3%; at least about −0.35%; at least about −0.4%; at least about −0.45%; at least about −0.5%; at least about −0.55%; at least about −0.6%; at least about −0.65%; at least about −0.7%; at least about −0.75%; at least about −0.8%; at least about −0.85%; at least about −0.9%; at least about −0.95%; or at least about −1%.

In some embodiments, the bar imparts a resulting strain in a longitudinal (axial) direction of: not greater than about −0.01%; not greater than about −0.02%; not greater than about −0.03%; not greater than about −0.04%/not greater than about −0.05%; not greater than about −0.06%; not greater than about −0.07%; not greater than about −0.08%; not greater than about −0.09%; not greater than about −0.1%. In some embodiments, the bar imparts a strain in the longitudinal (axial) direction of: not greater than about −0.1%; not greater than about −0.15%; not greater than about −0.2%; not greater than about −0.25%; not greater than about −0.3%; not greater than about −0.35%; not greater than about −0.4%; not greater than about −0.45%; not greater than about −0.5%; not greater than about −0.55%; not greater than about −0.6%; not greater than about −0.65%; not greater than about −0.7%; not greater than about −0.75%; not greater than about −0.8%; not greater than about −0.85%; not greater than about −0.9%; not greater than about −0.95%; or not greater than about −1%.

In some embodiments, the bar imparts a resulting strain in a transverse direction of: at least about 0.01%; at least about 0.02%; at least about 0.03%; at least about 0.04%/at least about 0.05%; at least about 0.06%; at least about 0.07%; at least about 0.08%; at least about 0.09%; at least about 0.1%. In some embodiments, the bar imparts a strain in the transverse direction of: at least about 0.1%; at least about 0.15%; at least about 0.2%; at least about 0.25%; at least about 0.3%; at least about 0.35%; at least about 0.4%; at least about 0.45%; at least about 0.5%; at least about 0.55%; at least about 0.6%; at least about 0.65%; at least about 0.7%; at least about 0.75%; at least about 0.8%; at least about 0.85%; at least about 0.9%; at least about 0.95%; or at least about 1%.

In some embodiments, the bar imparts a resulting strain on in a transverse direction of: not greater than about 0.01%; not greater than about 0.02%; not greater than about 0.03%; not greater than about 0.04%; not greater than about 0.05%; not greater than about 0.06%; not greater than about 0.07%; not greater than about 0.08%; not greater than about 0.09%; not greater than about 0.1%. In some embodiments, the bar imparts a strain in the transverse direction of: not greater than about 0.1%; not greater than about 0.15%; not greater than about 0.2%; not greater than about 0.25%; not greater than about 0.3%; not greater than about 0.35%; not greater than about 0.4%; not greater than about 0.45%; not greater than about 0.5%; not greater than about 0.55%; not greater than about 0.6%; not greater than about 0.65%; not greater than about 0.7%; not greater than about 0.75%; not greater than about 0.8%; not greater than about 0.85%; not greater than about 0.9%; not greater than about 0.95%; or not greater than about 1%.

In one aspect of the instant disclosure, an aluminum electrolysis cell is provided. The aluminum electrolysis cell includes: an anode; a cathode assembly; a liquid medium (e.g. molten salt bath. In one embodiment, the cathode assembly includes: a cathode block having a slot and a current collector subassembly. In one embodiment, the current collector subassembly is at least partially disposed in the slot of the cathode block. In some embodiments, the current collector subassembly is an adjustable bar, or an adjustable bar with a joint material which at least partially wraps (e.g. covers) the bar. In some embodiments, the bar is configured to conform to the cathode via an expansion of material inside the bar. As such, the interface between the current collector subassembly and the cathode block at the slot is maintained by the bar.

In some embodiments, the liquid medium is located between the anode and the cathode assembly. Aluminum is produced in the cell from the liquid medium (also referred to as a molten material/electrolytic bath). In some embodiments, aluminum metal is produced at the interface between the liquid bath and the liquid metal and as it forms, the liquid aluminum accumulates on top of the cathode block.

In one embodiment, the cathode collector subassembly and/or adjustable bar includes a compression detector (e.g. displacement detector). In some embodiments, the detector is located between the cathode block and the bar and the detector is configured to measure the expansion of the bar. In some embodiments, the detector is configured to measure the mechanical interface between the bar and block (e.g. amount of conformation/compression). In some embodiments, the detector is configured to measure the transverse expansion (e.g. fattening) of the bar. In some embodiments, the detector is configured to measure the amount of longitudinal expansion (lengthening) of the bar. In some embodiments, the detector measurements feed into a cell operating system (not shown) for example, as a real-time feedback loop to vary the amount of compression. In some embodiments, the compression is correlated based on the measured cell temperature, which affects the rate of deformation possible in the bar (i.e. through creep).

In another aspect of the instant disclosure, methods of making aluminum are provided. In one embodiment, the method of making aluminum includes the steps of: (a) producing aluminum in an aluminum electrolysis cell; (b) conforming an adjustable current collector bar to a cathode via an expandable material retained in the collector bar; and (c) maintaining, due to the imparting force step, an improved contact between the slot of the cathode block and the current collector subassembly.

In some embodiments, the producing step refers to transmitting electrical current from an anode to a cathode assembly, via a liquid medium, to produce aluminum in the cell. In one embodiment, the method includes: conforming the current collector subassembly to the cathode block to reduce the cathode voltage drop (CVD) by about 10 mV to about 100 mV. In one embodiment, the method includes: transversely expanding the current collector bar, via the conforming step, to maintain and/or improve the electrical contact between the current collector bar and the cathode (e.g. cathode slot). In some embodiments, the resulting electrical resistance from the bar is less than an initial electrical resistance (i.e. as measured without force from the expanded bar). In one embodiment, the method includes adjusting the amount of imparted force (e.g. pressure) to increase, decrease, or maintain the compression of the current collector bar into the cathode block slot at variable or continuous maintained conditions. In one embodiment, the method includes determining the force imparted on the end of the current collector subassembly.

In one embodiment, the inner void (sometimes called cavity) of the collector bar comprises an expandable material that is a gas. In one embodiment, the inner void of the collector bar comprises an expandable material that is a gas and a conductive insert in the collector bar. In one embodiment, the inner void of the collector bar comprises an expandable material that is a gas, a conductive insert, and a filler material.

In one embodiment, the inner void of the collector bar comprises an expandable material that is a pre-pressurized gas (e.g. pressure inside the cavity is above ambient pressure before the cell is pre-heated/before operation). In one embodiment, the inner void of the collector bar comprises an expandable material that is a pre-pressurized gas and a conductive insert into the collector bar. In one embodiment, the inner void of the collector bar comprises an expandable material that is a pre-pressurized gas, a conductive insert, and a filler material.

In some embodiments, the inner void comprises an expandable material that is a phase change material. In some embodiments, the inner void comprises an expandable material that is a phase change material and a conductive insert. In one embodiment, the inner void of the collector bar comprises an expandable material that is a phase change, a conductive insert, and a filler material.

In some embodiments, the inner void comprises at least two different expandable materials (e.g. a gas and a phase change material). In some embodiments, the inner void comprises two different expandable materials and a conductive insert. In some embodiments, the inner void comprises two different expandable materials, a conductive insert, and a filler material.

In one or more of the aforementioned embodiments, the inner cavity is sealed so that gas does not escape the collector bar. In one or more of the aforementioned embodiments, the collector bar does not have a vent. In one or more of the aforementioned embodiments, the sidewall is sealed to completely surround and encase the inner void which includes the expandable material.

In some embodiments, the expandable material is configured to reduce the cathode voltage drop attributed to the joint resistivity (i.e. between the cathode and the current collector bar). In some embodiments, the conductive insert is configured to reduce electrical resistance and/or increase axial conductivity (i.e. as the current leaves the cell).

In some embodiments, the pressure exerted by the expandable material on the wall of the inner void is sufficient to deform the cathode collector bar. In some embodiments, the wall thickness along the at least one sidewall is varied such that the deformation is tailored to the desired surface (i.e. along the collector bar to cathode block interface).

These and other aspects, advantages, and novel features of the technology are set forth in part in the description that follows and will become apparent to those skilled in the art upon examination of the following description and Figures, or is learned by practicing the embodiments of the disclosure.

BRIEF DESCRIPTION OF THE DRAWINGS

FIG. 2 depicts an embodiment of an adjustable collector bar with the void including an expandable material (e.g. gas), in accordance with the instant disclosure.

FIG. 3 depicts another embodiment of an adjustable collector bar with the void including an expandable material (e.g. gas) and a filler material in accordance with the instant disclosure.

FIG. 4 depicts yet another embodiment of an adjustable collector bar with the void including two types of expandable materials (e.g. gas and a solid material), in accordance with the instant disclosure.

FIG. 5 depicts still embodiment of an adjustable collector bar with the void including an expandable material (e.g. solid), in accordance with the instant disclosure.

FIG. 6 depicts still another embodiment of an adjustable collector bar with the void including an expandable material (e.g. solid) and a filler material, in accordance with the instant disclosure.

FIG. 7 depicts still yet another embodiment of an adjustable collector bar with the void including two types of expandable material (e.g. a gas and a solid) and filler material, in accordance with the instant disclosure.

FIG. 8 depicts still yet another embodiment of an adjustable collector bar with the void including an expandable material (e.g. solid) and a conductive material, in accordance with the instant disclosure.

FIG. 9 depicts still yet another embodiment depicts still yet another embodiment of an adjustable collector bar with the void including an expandable material (e.g. solid), a filler material, and a conductive material, in accordance with the instant disclosure.

FIG. 10 depicts still yet another embodiment of an adjustable collector bar with the void including an expandable material (e.g. solid) and a conductive material surrounding a portion of the solid material, in accordance with the instant disclosure.

FIG. 11 depicts still yet another embodiment of an adjustable collector bar with the void having two zones, a zone including an expandable material (e.g. solid) and filler material and a zone having a expandable material (e.g. solid) and a conductive material, in accordance with the instant disclosure.

FIG. 12A-12E depict various configurations of the adjustable current collector bar, in accordance with the instant disclosure.

FIGS. 13A and 13B depict a side-by-side cut-away view of the slot of the cathode assembly "before" at least one bar (on the left), compared to "after" the bar adjusts/expands (on the right), where FIGS. 13A and 13B depict the conformation of the cathode collector bar to the cathode slot, (thus, the resulting increase in electrical contact of the cell components.).

FIGS. 14A and 14B depict cut-away side views of the contact site between the cathode assembly components at operating conditions: before the bar is adjusted/expanded to impart force on the cathode (FIG. 14A), and after the bar is adjusted/expanded (FIG. 14B) imparts force on the cathode, in accordance with the instant disclosure. In FIG. 14B, the arrows inside the current collector bar depict the direction of the transverse movement of the bar sides resulting from creep due to the pressure (or force) exerted by the inner void of the bar via the expandable material.

FIGS. 15A and 15B depict embodiments of closing of larger macroscopic gaps (e.g. large enough gaps to be visually observable) between the block and the bar, while FIGS. 15C and 15D depict the improvement in contact between smaller scale asperities on the surfaces (e.g. slight projections on the surfaces, like those from surface roughness or unevenness). FIGS. 15A and 15C depict the block and bar interface before the expandable bar is utilized, while FIGS. 15B and 15D depict the block and bar interface after the bar has expanded transversely to increase the surface area of contact.

FIG. 25 depicts the components of Example 5, including the frame, the bench scale adjustable bar and another component prior to assembly into the tested configuration.

Various ones of the inventive aspects noted herein above may be combined to yield electrolysis cells and methods of operating the same to efficiently and effectively produce aluminum while using less electricity, thus lowering operating costs.

These and other aspects, advantages, and novel features of the invention are set forth in part in the description that follows and will become apparent to those skilled in the art upon examination of the following description and figures, or may be learned by practicing the invention.

DETAILED DESCRIPTION

Reference will now be made in detail to the accompanying drawings, which at least assist in illustrating various pertinent embodiments of the instant disclosure.

Figure 1:
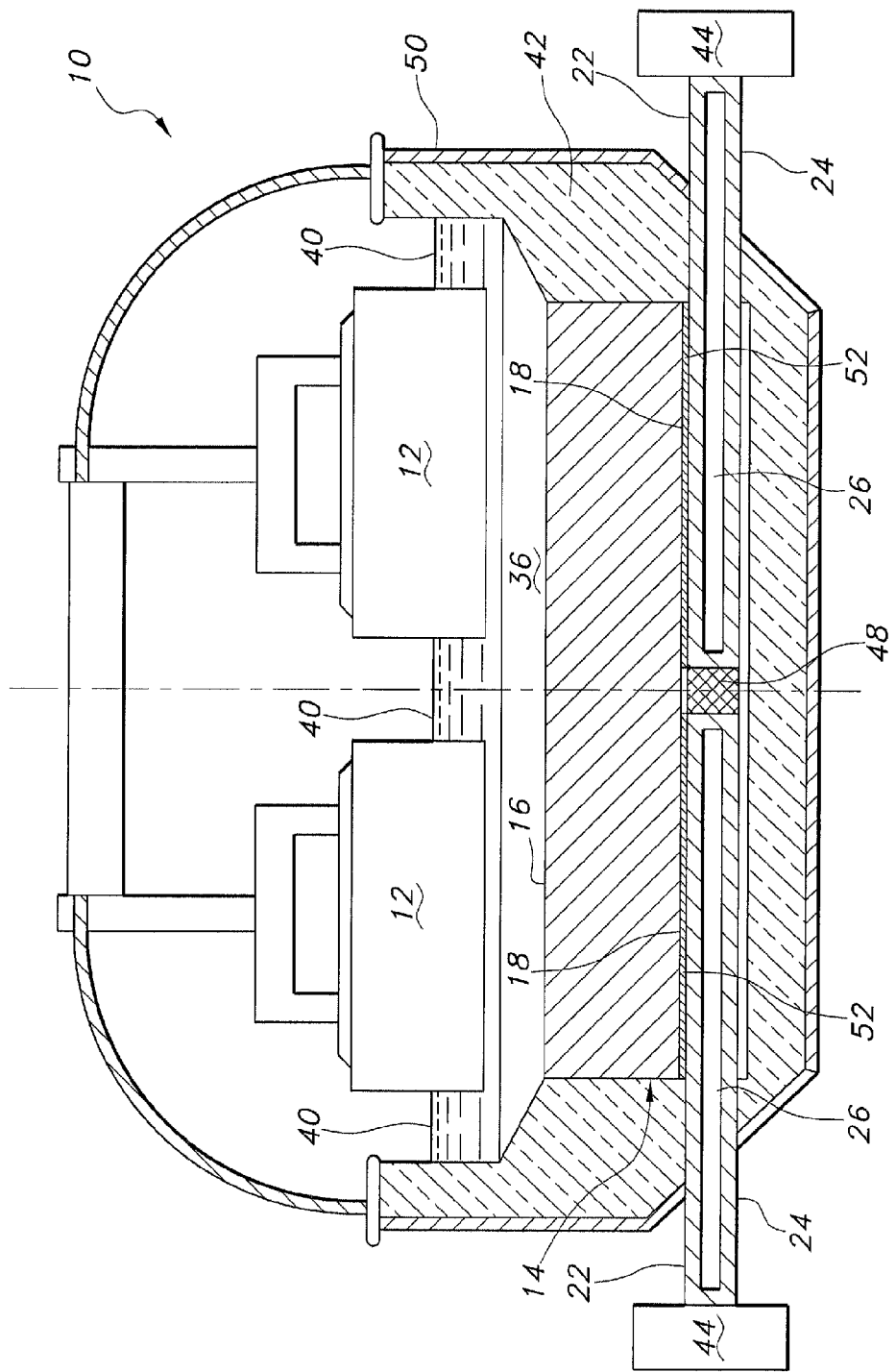
FIG. 1 is a schematic, cross-sectional side view of an embodiment of an aluminum electrolysis cell with an adjustable current collector bar, in accordance with the instant disclosure.

Referring to FIGS. 1 and 2, embodiments of an electrolysis cell are generally depicted. During aluminum production, the electrolytic cell 10 produces aluminum (e.g. commercially pure aluminum) at operating conditions. In some embodiments, the electrolysis cell 10 components are housed within a wall 50 (e.g. outer shell), which have refractory blocks (or material) 42 therein to insulate the system and protect the outside environment from leaks of hot electrolytic bath and/or aluminum. In some embodiments, the electrolysis cell 10 includes an anode 12, a cathode assembly 14 having an adjustable current collector bar 20, and a liquid medium 40.

In some embodiments, the cathode assembly 14 refers to the current collector subassembly 20 and the cathode 16. The current collector subassembly 20 refers to the collector bar 22, the joint material 50, and any electrical subassembly for transferring electricity out of the cell (not shown). In some embodiments, the cathode 16 and collector subassembly 20 are in a mated position, where the current collector subassembly 20 is at least partially retained a slot 18 of the cathode 16. In some embodiments, the ends of the current collector bar(s) 20 extend out from the refractory 42 and wall 50. As a non-limiting example, the cathode 16 is located at the base of the aluminum electrolysis cell 10. In some embodiments, the cathode 16 conducts the electrical current and transfers the electrical current (i.e. through its form) to exit the cell 10 via the electrical buswork (not shown). In some embodiments, the current enters the cathode 16 from the liquid medium 40 (e.g. molten electrolyte). In some embodiments, the current enters the cathode 16 from the aluminum metal pad 36 (i.e. which has formed atop the cathode 16) during cell operation (aluminum production). During operation, aluminum 36 (i.e. the metal pad) is produced on the surface of the cathode 16 (see, e.g. FIGS. 1 and 2).

In some embodiments, the aluminum electrolysis cell 10 has more than one bar, for example, twenty, forty, or eighty. In some embodiments, the anode 12 emits an electrical current into the electrolytic cell 10 and into the liquid medium 40. As a non-limiting example, the liquid medium 40 includes molten salt electrolyte, and also generally refer to any intermediates, byproducts, or products formed thorough the reaction process of alumina to aluminum. In some embodiments, the electrolyte includes cryolite ($Na_3AlF_6$) and alumina ($Al_2O_3$). From the liquid medium 40, the electrical current acts to produce aluminum 36 within the electrolytic cell 10. In some embodiments, the electrical current exits the electrolysis cell 10 through the cathode assembly 14.

In some embodiments, the cathode 16 is constructed of one or more known and accepted materials. In one embodiment, the cathode 16 is carbon (e.g. in block form). In some embodiments, the cathode 16 includes a slot 18. In some embodiments, the slot 18 is preformed along a lower surface of the cathode 16. In some embodiments, the slot 18 has a sufficient size dimension so that the current collector subassembly 20 fits at least partially into the slot 18. In some embodiments, the slot 18 substantially encloses (surrounds) the bar 22. In some embodiments, the slot 18 surrounds a portion of the bar 22 (some but not all sides) (i.e. bottom exposed). In some embodiments, the adjustable collector bar 22 exerts force (or pressure) onto the adjacent cathode as the inner void of the collector bar are pushed outward (e.g. in a transverse direction). In some embodiments, the collector bar 22 thus expands in a transverse direction to conform to the cathode slot and reduce electrical resistance across the cathode assembly.

Referring to FIG. 1, in some embodiments, the inner ends of two collector bars are spaced by a spacing material 48. In one embodiment, the spacing material 48 includes a non-reactive material which is not degraded at operating conditions. As non-limiting examples, the spacing material 48 can include ceramic materials, refractory materials, or the like, and may be in particulate or solid (block) forms between the cathode bar ends.

Referring to FIG. 1, the current collector subassembly 20 includes the current collector bar 22 and a joint material 52 (e.g. copper insert and/or joint). In some embodiments, the current collector bar 22 extends from one end of the cathode 16 to the other end of the cathode 16. In some embodiments, the outer end of the bar 22 includes an anchor and/or brace 44 (i.e. to restrict axial movement).

In some embodiments, the current collector bars 22 include anchors 44 which maintain the bars 22 in place (e.g. restrict axial/longitudinal movement). In some embodiments, outward (rigid body) motion of the bars 22 are restrained with anchors 44 which are attached/anchored to the pot lining 42. In other embodiments, the anchors 44 are attached to the ends or sides of the current collector bars 22, external to the cell wall 50.

Referring generally to FIGS. 2-12, various embodiments of an adjustable current collector bar are depicted, in accordance with the instant disclosure. In some embodiments, the adjustable bar includes a gas 28 and an expandable material 30. After being heated, the expandable material 30 expands (e.g. via a phase change and/or chemical decomposition) and the gas 28 expands (e.g. via the ideal gas law) increase the inner volume of the inner void 26 and push the walls 24 of the bar outward. In some embodiments, the expandable material 30 completely transforms to gas (e.g. no solid/particulates in the void 26 after heating). In some embodiments, the expandable material 30 degrades or transforms into one or more compositions, where some solid material is left in the void 26 (e.g. after heating).

"Conform", as used herein, means to adapt the shape and/or size of a first component to that of a second component. For example, a current collector bar 22 conforms to the slot 18 of a cathode 16 due to an increased amount of force applied to the sidewalls 24 by the increased pressure in the inner void 26 of the bar.

In some embodiments, initially, a small amount of the collector bar 22 is in contact with the slot 18, which leads to poor cell performance. After the conformation, the shape of the collector bar 22 more closely matches the size and/or shape of the slot 18, leading to an increased amount of direct contact (contact site) between the collector bar 22 and the slot 18. This increased amount of contact facilitates improved cell 10 performance (e.g. reduced electrical resistance across the cathode to bar joint. The amount of conformation of the current collector subassembly 20 to the slot 18 is measured by a decrease in cathode voltage drop. This indicates a good attachment/connection site and thus, conformation. In some embodiments, cathode voltage drop is typically on the order of about 200 mV to about 500 mV during the operation of the aluminum electrolysis cell 10. It is believed that at least about up to 100 mV is directly due to poor (loose) electrical contact (between the slot 18 of the cathode 16 and the current collector bar 22).

Without being bound to a particular mechanism or theory, by approximating from the ideal gas law, the increase from ambient to operating temperature (from 20° C. to 900° C.) works to increase the pressure of the gas inside the bar. However, there may be reductions in this pressure due to loss of oxygen (e.g. to rust) and subsequent volume increase of the bar (e.g. metal expansion).

In some embodiments, the bar is pressurized (e.g. at room temperature, or at a temperature below cell operating conditions) prior to undergoing an increase in temperature (and increase in pressure). In some embodiments, the bar is pre-pressurized to (i.e. the bar as an initial internal pressure of): at least about 5 psig; at least about 10 psig; at least about 15 psig; at least about 20 psig; at least about 25 psig; at least about 30 psig; at least about 35 psig; at least about 40 psig; at least about 45 psig; at least about 50 psig; at least about 55 psig; at least about 60 psig; at least about 65 psig; or at least about 70 psig. In some embodiments, the bar is pre-pressurized to (i.e. the bar as an initial internal pressure of): not greater than about 5 psig; not greater than about 10 psig; not greater than about 15 psig; not greater than about 20 psig; not greater than about 25 psig; not greater than about 30 psig; not greater than about 35 psig; not greater than about 40 psig; not greater than about 45 psig; not greater than about 50 psig; not greater than about 55 psig; not greater than about 60 psig; not greater than about 65 psig; or not greater than about 70 psig.

In some embodiments, the bar is pressurized to: at least about 5 psig; at least about 10 psig; at least about 15 psig; at least about 20 psig; at least about 25 psig; at least about 30 psig; at least about 60 psig; at least about 80 psig; at least about 100 psig; at least about 120 psig; at least about 140 psig; at least about 160 psig; at least about 180 psig; at least about 200 psig; at least about 220 psig; at least about 240 psig; at least about 260 psig; at least about 280 psig; or at least about 300 psig.

In some embodiments, the bar is pressurized to: not greater than about 5 psig; not greater than about 10 psig; not greater than about 15 psig; not greater than about 20 psig; not greater than about 25 psig; not greater than about 30 psig; not greater than about 60 psig; not greater than about 80 psig; not greater than about 100 psig; not greater than about 120 psig; not greater than about 140 psig; not greater than about 160 psig; not greater than about 180 psig; not greater than about 200 psig; not greater than about 220 psig; not greater than about 240 psig; not greater than about 260 psig; not greater than about 280 psig; or not greater than about 300 psig.

In another embodiment, a small amount of expandable material (e.g. gas 28, solid expandable material 30) is sealed inside the bar, where the material adds to the increase in pressure inside the bar as it heats up (e.g. by a phase change to gas). For example $MgCO_3$ releases $CO_2$ gas near 350° C.

In some embodiments, the bar is used with filler material 34 (sometimes called particulate substrates, or inert material) inside bar and/or between the bar ends. Filler material 34 is generally selected from solid materials that maintain stiffness (e.g. rigidity) at elevated temperature and/or materials that do not degrade or decompose at cell operating temperatures. Non-limiting examples of fillers include: tabular alumina, ceramics, copper, and the like. In some embodiments, the bars are welded closed, though other methods of sealing the bars may be employed.

FIG. 13A-13B is a cross sectional side view, of the bar 22 in the slot 18. FIG. 13A depicts the gap, or low joint surface area/interface (FIG. 13A, on the left) compared to the high interface/surface area in the joint (FIG. 13B on the right) once the bar to the slot 18 of the cathode 16 (FIG. 13B).

FIG. 14A-14B is a partial cross sectional front view. FIG. 14A depicts the gap, while FIG. 14B depicts in a generally perpendicular direction to the longitudinal axis. In some embodiments, the adjustable current collector bar 22 compresses/conforms itself onto the surface of the cathode slot, via the increase in pressure from the expansion of gas and or material in the inner void. In some embodiments, the bar 22 is sufficiently designed to apply continuous force required to conform the bar to the slot 18 at operation conditions within the aluminum electrolysis cell (e.g. at least about 800° C.).

Referring to FIG. 14B, a detector/sensor 38 is employed in conjunction with an anchor 44. The detector 38 (e.g. sensor) includes a displacement gauge which detects the amount of compression of the current collector subassembly 20. In some embodiments, this measurement is completed by measuring the relative length of the current collector bar 52 as it protrudes from the wall of the electrolytic cell 10. In some embodiments, the amount of expansion/conformation to the cathode by the bar is detected by measuring the force that is imparted by the bar 22 onto the slot 18. In some embodiments, the induced deformation in the collector bar 22 causes gaps between opposing surfaces in the joint to partially, or fully close. In some embodiments, increasing the amount of area in contact between the cathode 16 subcomponents reduces the electrical contact resistance, to allow electricity to flow from one material to another more easily (i.e. with less resistance).

Figure 15A:
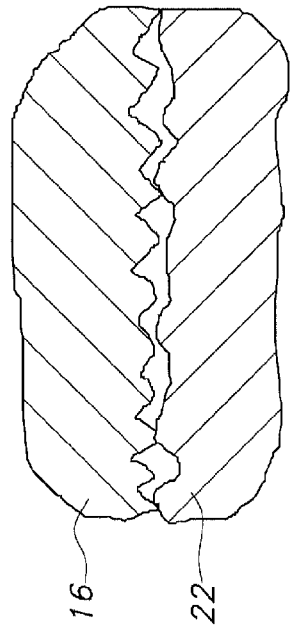
FIGS. 15A-15D depict additional embodiments of types of gaps between the cathode slot and the current collector bars, before and after, the bar is adjusted/expanded. Each of the Figures depicts a close-up view of a portion of the interface (e.g. border) between the cathode block/cathode slot and the current collector bar.
Figure 15B:
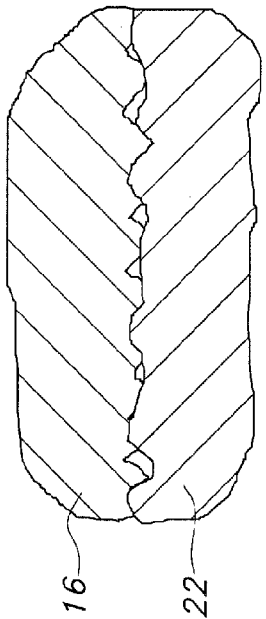
Figure 15C:
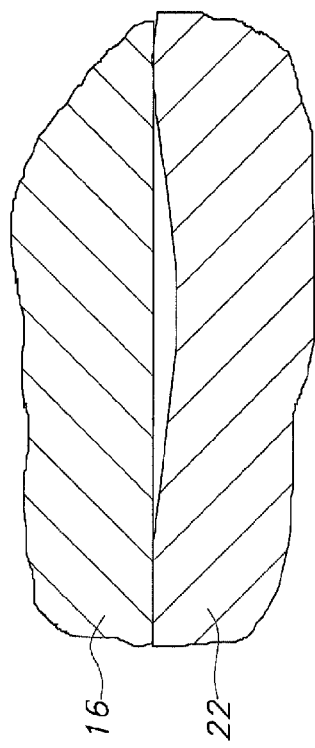
Figure 15D:
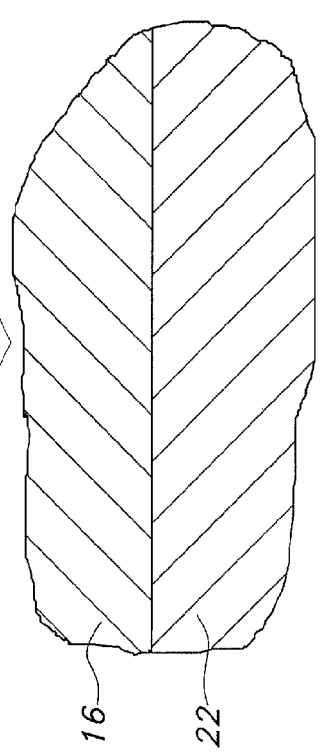

FIGS. 15A and 15B depict a 'before' and 'after' view of a large macroscopic gap between the cathode 16 and the current collector bar 22. In this example, once the bar is pressurized, the gap appears to be completely closed. In another example, when surfaces are non-uniform, as depicted in FIGS. 15C and 15D, the frequency and/or extent of contact between the 16 and the bar 22 is increased between these smaller asperities, but the small gaps from the non-uniform surfaces are not completely eliminated. In some embodiments, the increase in contact area occurs at the interface between: (a) the slot and the joint material; (b) the joint material and the bar (c) the bar and the slot (in the absence of joint material); and (d) combinations thereof.

Figure 16:
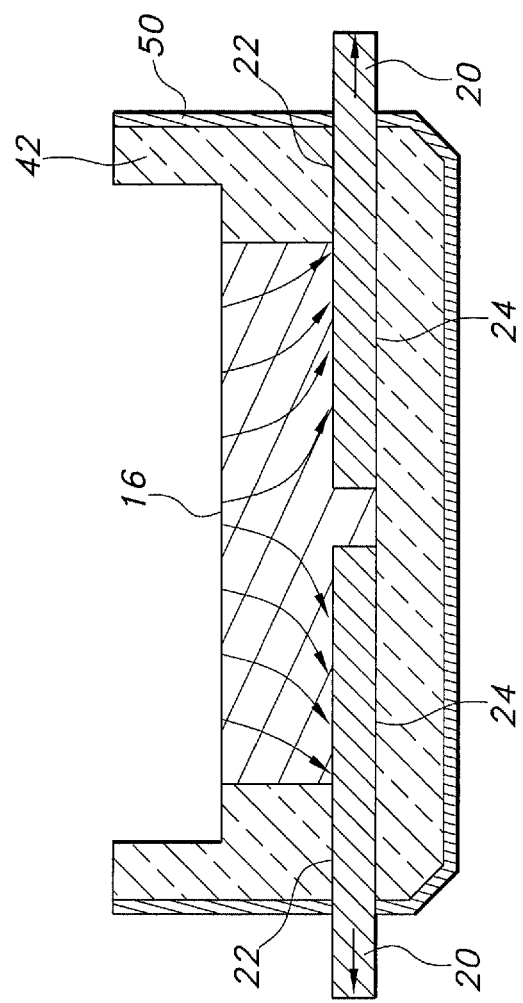
FIG. 16 depicts a partial cross-sectional vie of an aluminum electrolysis cell showing via arrows, the general flow/path of electrical current through certain cell components.

FIG. 16 depicts an exemplary path of the electrical current from the cathode block 16 as it moves towards the ends of the current collector bars 22. The electrical current is depicted by arrows. In some embodiments, the current collector bar 22 collects an electrical current from the electrolysis cell 10 (via the cathode 16) and transfers the electrical current out of the cell 10. In some embodiments, the current collector bar 22 is made of various conductive materials. As a non-limiting example, the current collector bar 22 is made of metallic materials (e.g. suitable for conducting electricity). In some embodiments, the current collector bar 22 includes a joint material 52 extending along a portion of the surface of the current collector bar 22.

The "joint material" 52 refers to a conductive material which promotes better attachment and electrical contact. In some embodiments, the joint material is located between the surface of the current collector bar 22 and the slot 18 of the cathode 16. Non-limiting examples of joint materials 52 include: metallic sheets, cast iron, copper, and/or adhesives. In some embodiments, the current collector subassembly 20 is partially disposed in the slot 18 to enable removal of electrical current from the electrolysis cell 10.

In some embodiments, adjustable bar 22 promotes an interface 46 (or a surface) forming a common boundary between two materials. In some embodiments, the interface 46 of the current collector subassembly 20 and the slot 18 of the cathode 16 is improved as the current collector subassembly 20 conforms to the slot 18, so that electrical current is more effectively transferred from the cathode 16 to the current collector subassembly 20 (i.e. little contribution to cathode voltage drop (CVD)). By "improved", it refers to the increase in the amount of either macroscopic or microscopic area where the subassembly and the surface of the slot are in direct contact.

EXAMPLES

Creep and Expansion in Cathode Assembly Materials

In order to determine the minimum amount of force necessary to get appropriate creep in the collector bars at operating conditions, experiments were conducted to determine the rate of creep over periods of time for scaled-down samples of collector bar steel at operating conditions with an external force applied.

In some embodiments, at cell operating conditions, too little force may not cause enough deformation to reduce CVD, while too much force may cause the bar to deform to such an extent that the (carbon) cathode block breaks.

Figure 17:
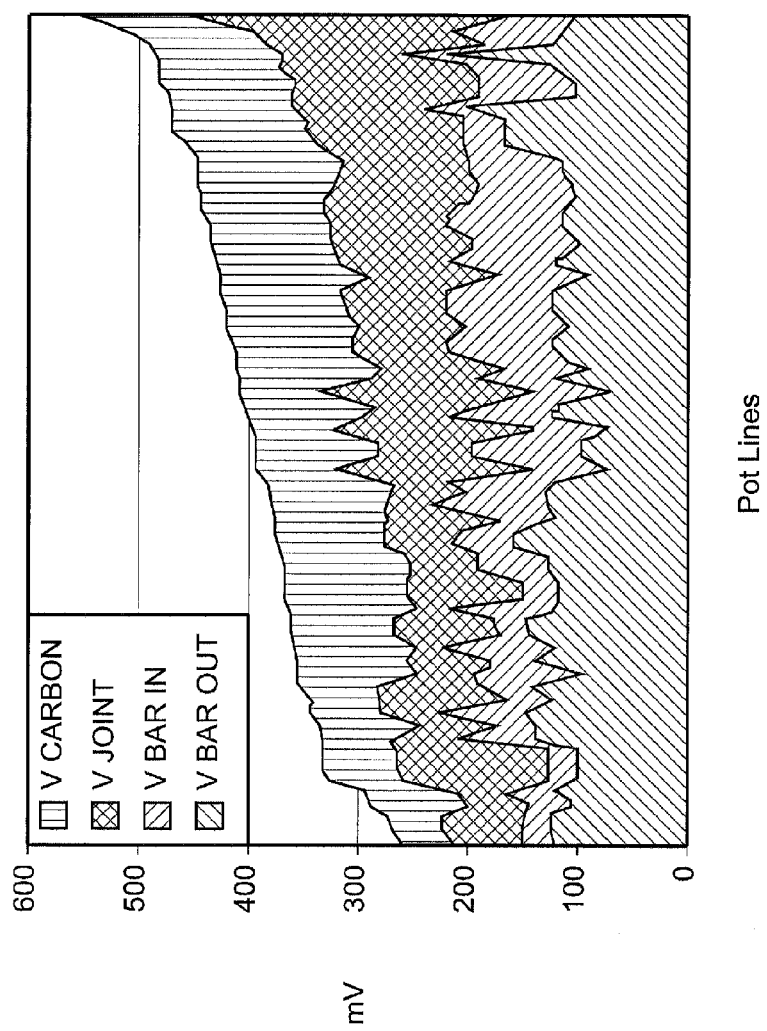
FIG. 17 depicts the voltage drop of different cell components (carbon cathode block, joint between cathode and collector subassembly, the portion of the collector bar adjacent to (e.g. embedded in) the carbon cathode block (bar in) and the outer end of the collector bar extending outside the carbon cathode block to where the electrical bus work removes current from the cell (bar out). The horizontal axes represent changes between pot lines at various smelters.

FIG. 17 depicts a model results of the voltage loss across different components with joint (contact) resistance adjusted to match average measured CVD values from a number of pot lines in different plants with different pot types.

Figure 18:
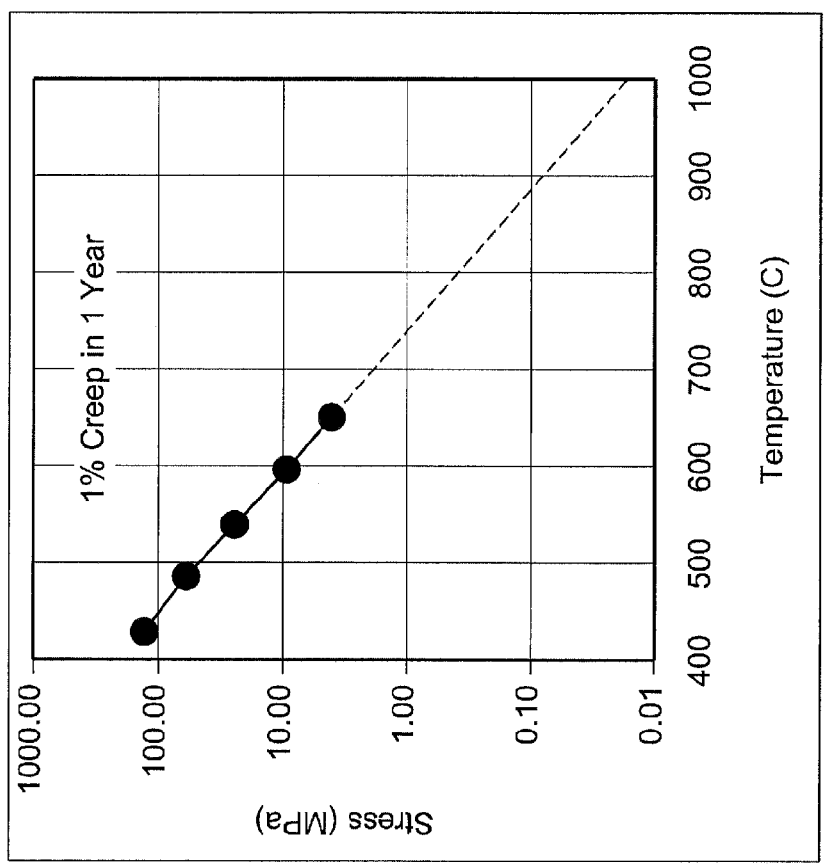
FIG. 18 is a graphical depiction of how the stress required for creep in the solid collector bar decreases with increasing temperature, extrapolated to pot operating temperature. The stress required to cause 1% creep over one year (Stress (MPa)) is plotted vs. Temperature (C).

FIG. 18 depicts how the stress required for creep in the collector bar decreases with increasing temperature, extrapolated to electrolytic cell operating temperatures, plotted as stress versus temperature.

In the system examined, the aluminum electrolysis cell operates at high temperatures and preferably has a low rate of creep. For low creep rates and high temperature, Harper-Dorn dislocation climb is believed to be a good model for secondary creep. The equation for strain rate, $\dot{\varepsilon}$, is:

$$\dot{\varepsilon} = A_{HD} \frac{Gb}{kT} D_0 e^{-\frac{Q}{RT}} \left(\frac{\sigma}{G}\right)$$

Under the experimental operating conditions, everything in the equation is fairly constant except strain rate $\dot{\varepsilon}$ and stress ($\sigma$), and in the equation these are proportional.

Figure 19A:
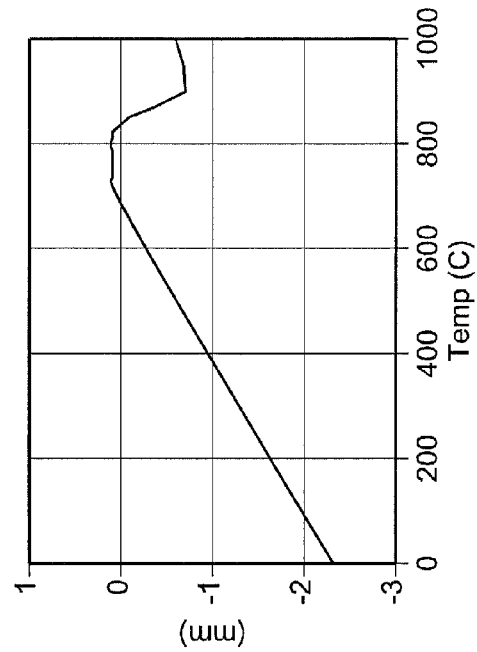
FIG. 19A depicts the differences in thermal expansion of different cathode and collector bar components, plotted as expansion (%) vs. Temperature (C).
Figure 19B:
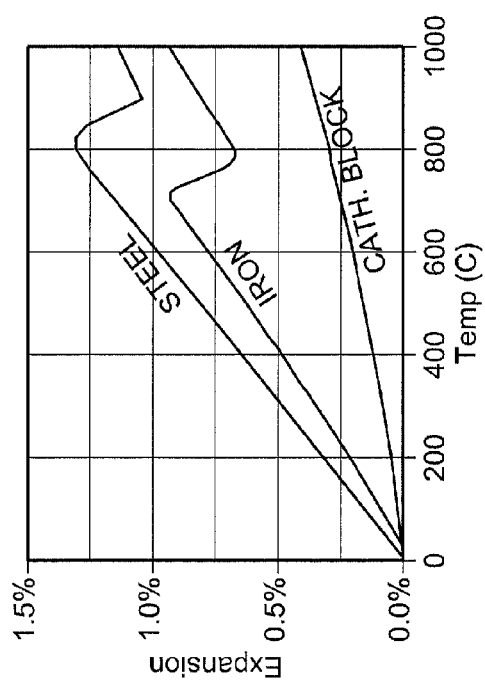
FIG. 19B depicts an example of calculated interference that results between the cathode (cath. block) and the collector bar (iron & steel) plotted as Distance (mm) vs. Temp. (C). Negative values represent a gap.
Figure 19C:
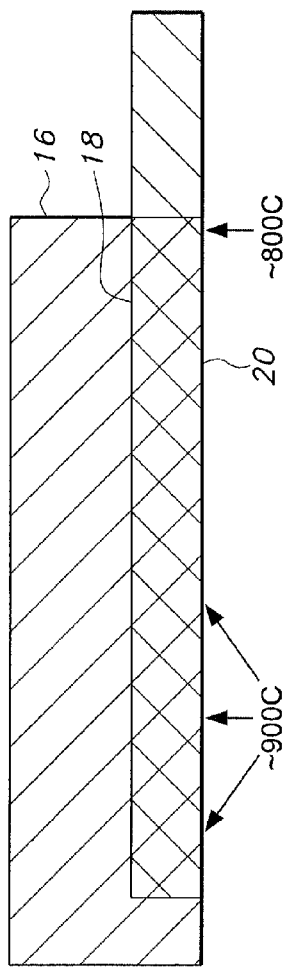
FIG. 19C depicts a cut away side view of the cathode and collector assembly, showing a difference in temperature from the inner current collector end (~900° C.) and the transition to the outward collector bar end (~800° C.), adjacent to where the bar exits the cell.

FIG. 19A depicts the different thermal expansion of the cathode block material versus collector subassembly materials (steel and iron) at different temperatures. FIG. 19B depicts an example of the calculated gap (distance, measured in mm) versus temperature (C). FIG. 19C depicts that under operating conditions, the collector bar (of the depicted configuration) exhibits different temperatures along its length (e.g. ~900° C. towards the inner end, and ~800° C. towards the outer end (i.e. near where the bar leaves the cathode block, yet still inside the cell wall).

Example 1

Bench Test of Creep in Collector Bar Material

Bench tests were conducted to determine the creep for a certain load/force on the collector bars. In each test, a two inch long, inch diameter rod of 1018 steel was loaded with a 50 pound weight (113 psi). Two tests were conducted, where one sample was held in compression for one week at about 930° C., and the other sample was held at compression for two weeks at about 930° C.

The resulting test specimens became slightly shorter and wider. The first sample gave an axial strain rate of 0.0015%/hr. The second sample gave an axial strain rate of 0.0012%/hr. The widening rate, which is needed to improve the joint, was 0.0019%/hr for the first sample and 0.00074%/hr for the second sample. It should be noted that in the first test the diameters were measured with less precision, which may explain the high value of 0.0019%/hr, as compared to the second sample. These results indicate that with reasonable applied forces onto the current collector bar, widening of the bar into the slot of the cathode block is achievable. It is noted that the tested bars were solid (i.e. did not have inner voids); thus, bars with an inner void are expected to have an increased strain as compared to solid metal bars. Thus, electrical contact is increased, joint resistance is decreased, and CVD is decreased.

Example 2

Bench Test of Adjustable Bar

Figures 20A, 20B:
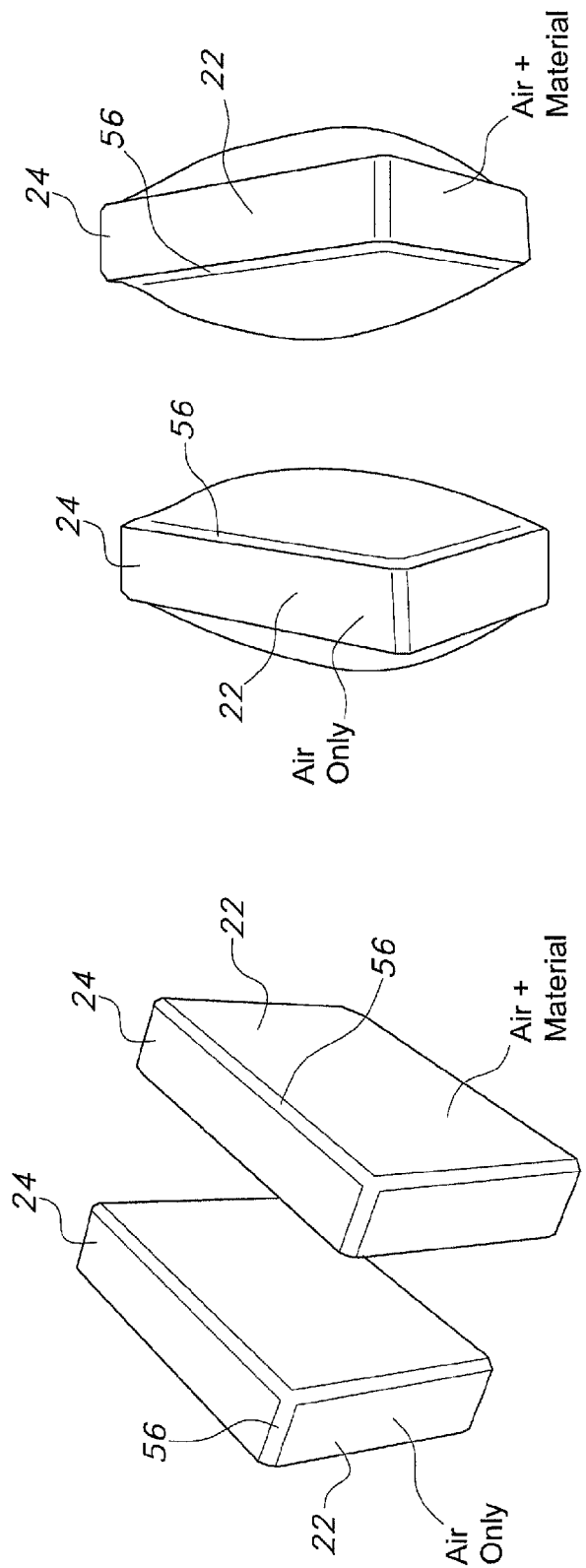
FIG. 20A depicts two bench models of cathode bar materials having an inner void with expandable material.
FIG. 20B depicts the expandable bars in an expanded state, with walls expanded in an outward direction.

FIGS. 20A and 20B depict a perspective view of two bench scale bars having inner voids shown side by side. (While these bars are rectangular, other shapes are possible.) FIG. 20A depicts the bars before expansion and FIG. 20B depicts the bars after expansion.

Example 3

Bench Test of Adjustable Bar

Figure 21:
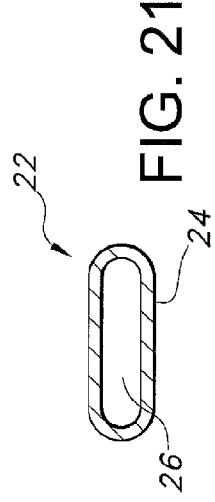
FIG. 21 depicts an exemplary cutaway side view of a different configuration of an adjustable bar used for the trial depicted in FIG. 22.
Figure 22:
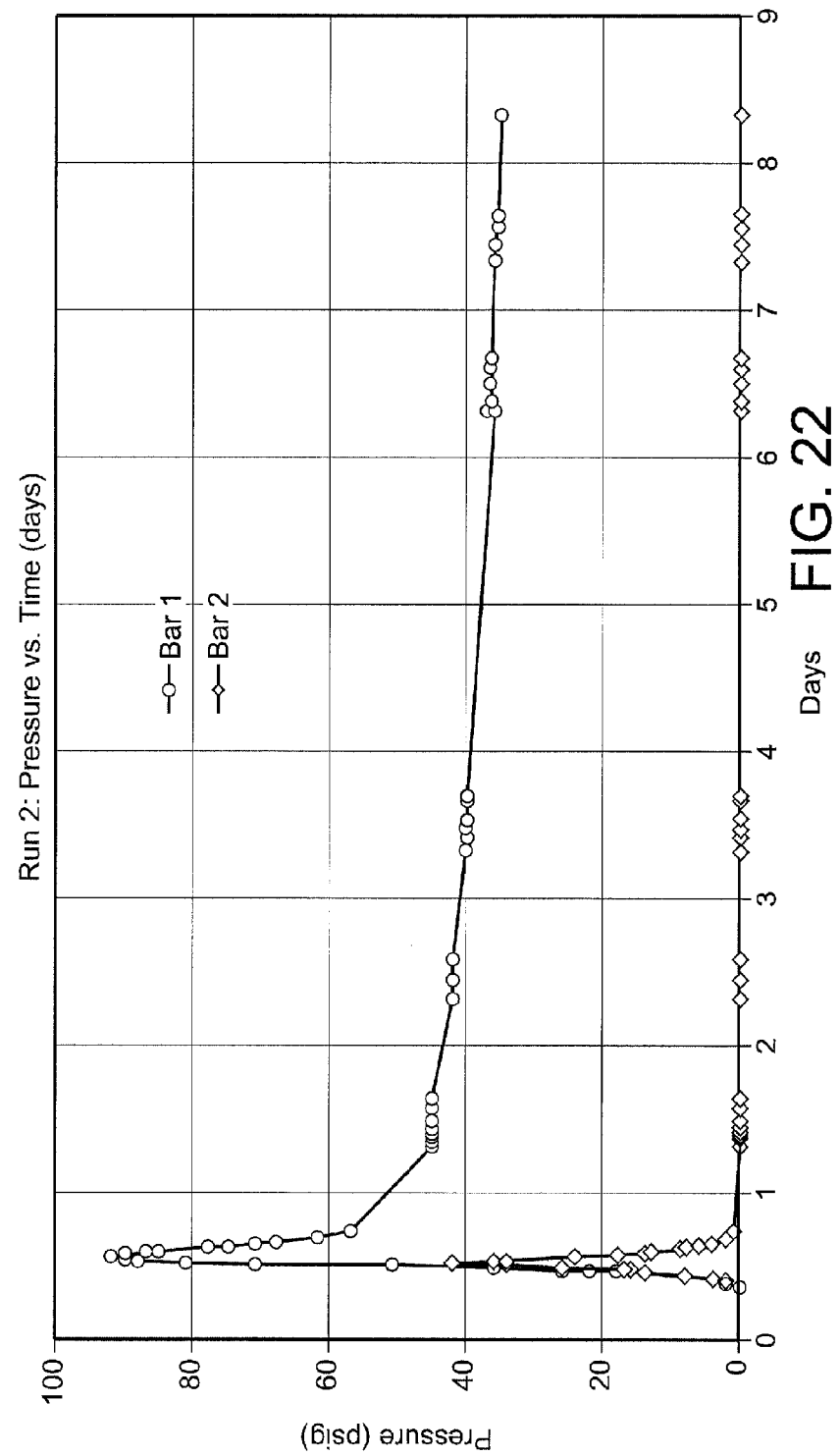
FIG. 22 depicts the trial run of two bench scale adjustable bars, depicting the Pressure (PSIG) as a function of Time (Days).

Another set of adjustable bars were constructed, both with rounded edges as depicted in the cross-sectional view of FIG. 21. Both bars had 1 gram of $MgCO_3$ which released $CO_2$ resulting in the pressure increase between 350° C. and 450° C. Bar 1 was constructed of ¼" carbon steel walls, while Bar 2 was constructed of ⅛" stainless steel walls. For each bar, the walls were sealed with welds. FIG. 22 is a chart that shows the pressure in the two bars over time (delays). While Bar 2 failed (did not retain pressure) due to an inadequate weld, Bar 1 maintained a substantial pressure throughout the trial period.

Example 4

Figure 23:
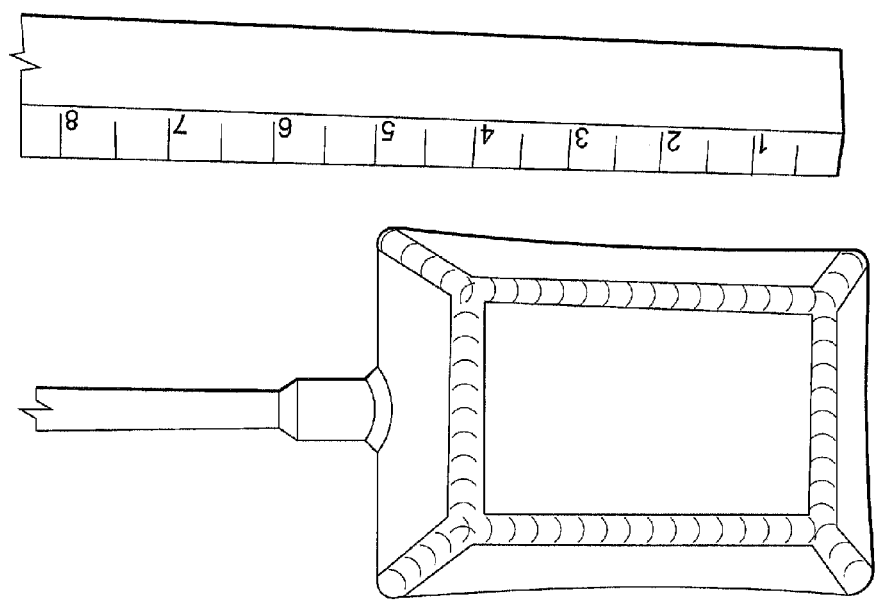
FIG. 23 depicts a plan side view of an adjustable bar of a second trial run.
Figure 24:
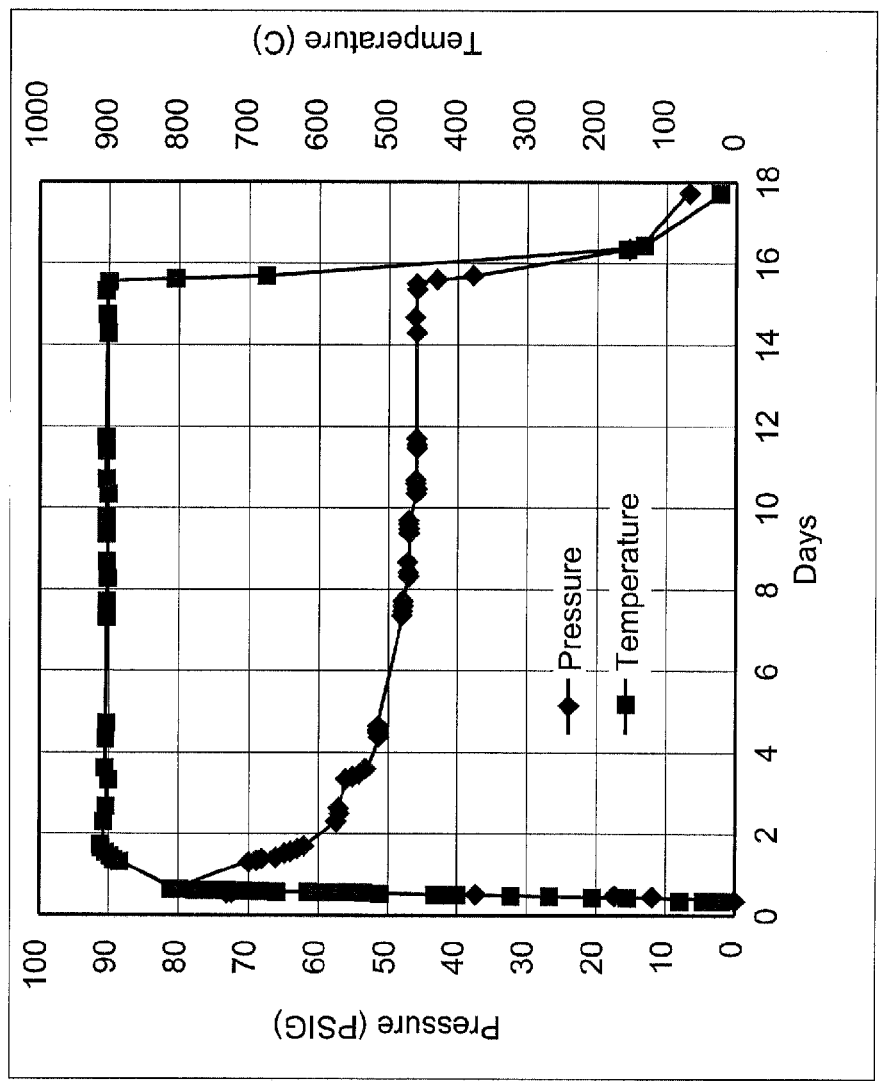
FIG. 24 depicts the resulting pressure (PSIG) and Temperature (C) as a function of Time (days).

Referring to FIGS. 23 and 24, another bar was constructed and underwent a 16-day experimental trial. The bar had steel walls that were approximately ⅛ inch thick and the bar was constructed of 304 stainless steel, as depicted in FIG. 23. The bar faces were made of flat plate, while the rounded sides were cut from half sections of tube. The faces and edges (e.g. rounded edges) were attached by welding. This test bar had nominal external dimensions of 5×3.5×1.25 inches. It contained 1 gram of $MgCO_3$, which contributed to the internal pressure by releasing $CO_2$ gas at the elevated temperature. The test bar was partially constrained during the test, so that the "inflated" thickness of the bar increased only by about ⅜ inch. It should be noted that the pressure tap located near the top of the test bar was only for measuring the internal pressure of the test piece, and did not supply pressure to the test bar.

Throughout the test (over a two-week period), the bar maintained significant pressure at a temperature of approximately 900° C. There were no leaks observed in the bar. It is estimated that this structure, in an electrolysis cell start-up and/or operating conditions, would cause significant (e.g. permanent) deformation of a collector bar in an operating pot, i.e. to prevent, reduce, and/or eliminate a gap between the cathode collector bar(s) at the cathode slot.

Referring to FIG. 24, the chart plots the internal pressure of the bar and temperature, as a function of time during the test (over an 18 day period). Without being bound to a particular mechanism or theory, the initial increase in pressure to a peak of 91 PSIG was believed to be driven by both the temperature (as per the ideal gas law) and release of $CO_2$ from the one gram of $MgCO_3$ powder inside the bar, while the subsequent decrease in pressure was believed to be due to the volume expansion of the test piece, and possibly also due to the absorption of some gas species by the steel (perhaps nitrogen). It was observed that the pressure was extremely steady over the final week of the test (e.g. day 7-~16) at approximately 46-47 psig (as depicted).

It should be noted that the final drop in pressure (at the end of the test) was due to the drop in temperature (e.g. removal from heat), and not due to a leak. The test piece maintained a reduced positive pressure after the test, (e.g. as would be expected under the ideal gas law.)

Example 5

Bar Deformation of Steel Frame and Block

Figure 27:
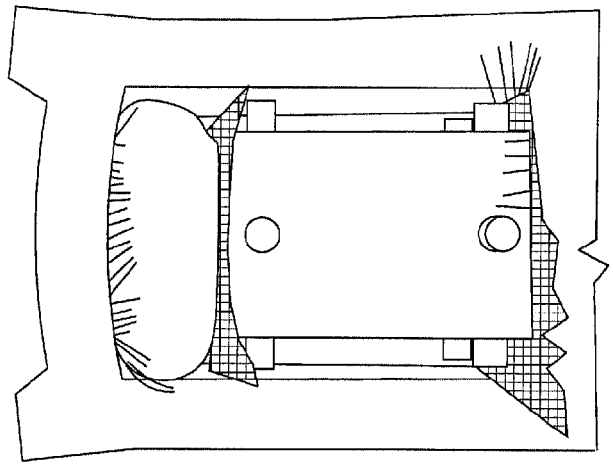
FIG. 27 depicts the assembled configuration for Example 5, after testing.
Figure 26:
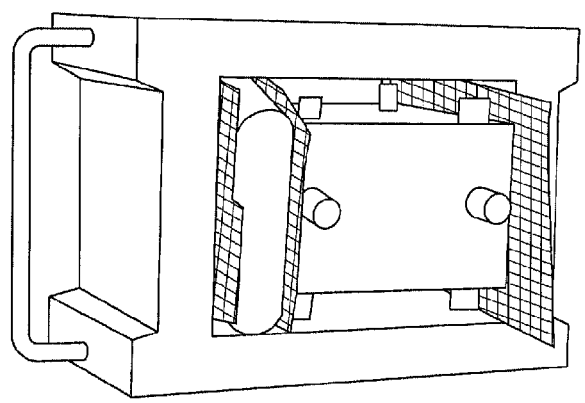
FIG. 26 depicts the assembled configuration of Example 5, before testing.

An experiment was performed to test whether an adjustable bar (e.g. of steel) was capable of enough compression to deform an industrial sized collector bar cross section (e.g. steel, and another steel frame, while maintaining pressure (e.g. not leaking). Referring to FIG. 25, this bench test used a steel frame (right) to constrain an adjustable bar (left) and a short (4.5" high) steel bar (middle) with a cross section of (3"×4.5"). The assembled components before the test are depicted in FIG. 26, while the assembled components after the test are depicted in FIG. 27.

In order to read the pressure during the experiment, the bar was fitted with a tube leading to a pressure gauge. (In an operating cell, this pressure gauge would be omitted.) The bar contained 4 grams of $MgCO_3$, which was believed to decompose and release $CO_2$ gas (near 350° C.) as the configuration heated up to cell operating temperature of approximately 900° C. The resulting $CO_2$ which is generated inside the bar in turn pressurized the bar, which, in combination with the elevated temperature conditions, resulting in the bar's walls deforming/bowing outward and imparting pressure (compressing/conforming) the adjacent steel block and frame. FIG. 27 depicts the bar and restraining frame, with the bar and block inserted into the frame. Thermocouples were placed near the inside top and bottom of the frame. Graphite cloth was used between the bar-to frame and block-to-bar contact points to prevent steel pieces from touching and welding together at temperature. The configuration was surrounded by packing coke and an argon purge, to prevent oxidation of the carbon steel frame and steel block bar. The bar was constructed of 304 stainless steel plate and 304L stainless steel tube, both nominally 0.125" thick. The bar's external dimensions were 4"×5.5"×1.25".

The steel block was fitted with stainless steel pins for measuring the vertical deformation caused by the adjustable bar. Referring to FIG. 27, while the vertical compression/conformation of the steel block is not apparent to the naked eye, the bending stresses developed in the restraining frame were high enough to cause visible deformation.

Figure 28:
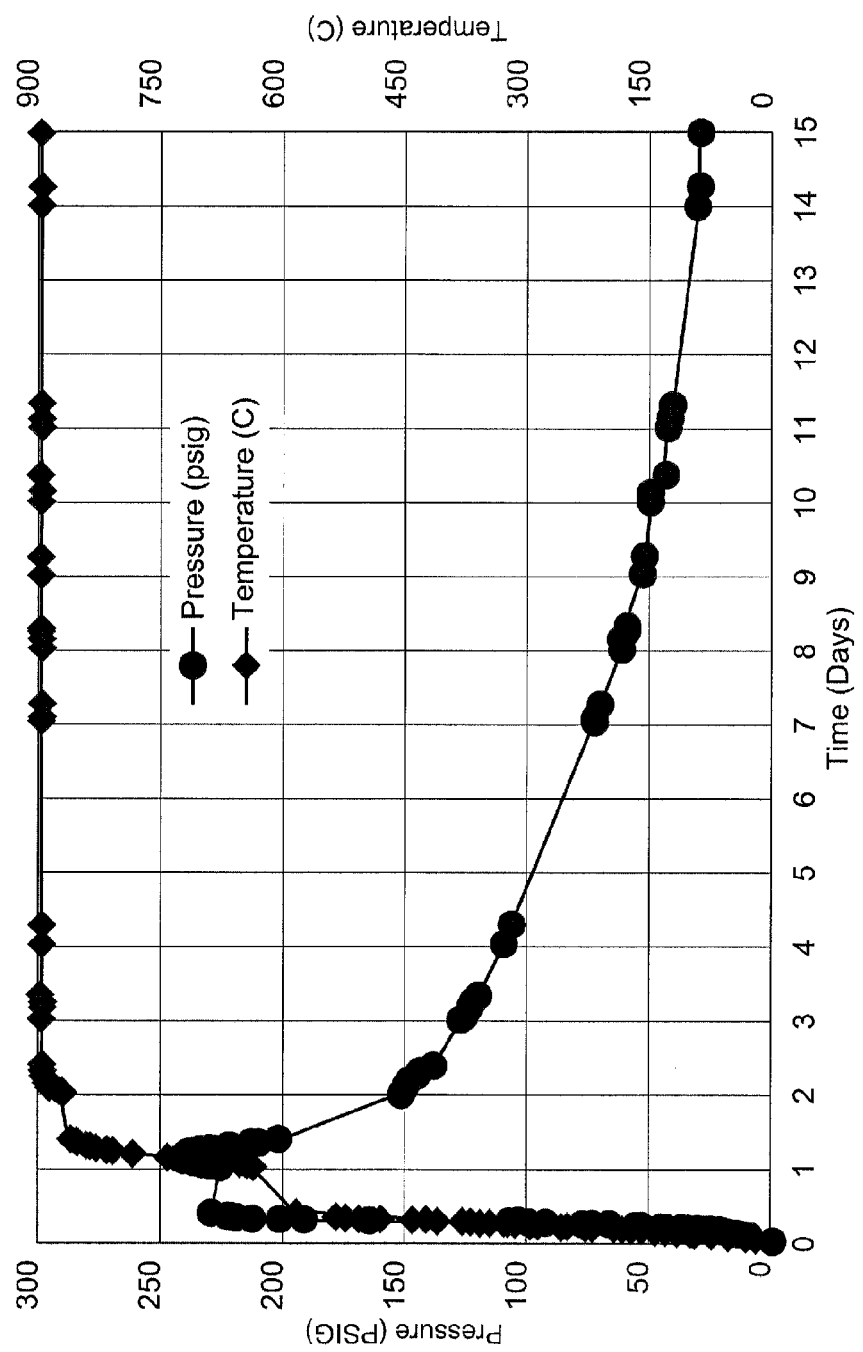
FIG. 28 is a graphical representation of pressure and temperature vs. time (in days) for Example 5.

FIG. 28 depicts the average temperature and bar pressure over the course of the test (depicted as a function of time, in days). Referring to FIG. 28, the temperature was brought up to 600° C. during the first day and then up to 900° C. on the second day, where it stayed for two weeks. Referring to FIG. 28, the pressure peaked near 250 psig, then decreased rapidly (at first), followed by a more gradual decrease in pressure. By the end of the test, the pressure was at about 30 psig. Without being bound to a particular mechanism or theory, it was believed that some pressure was lost inside of the bar due to surface reactions between the $CO_2$ generated and the inner steel surface of the bar.

Measurement of the inside and outside pin spacing as well as measurement of the full steel bar height showed a total compressive strain (shortening) of about 0.14% in a longitudinal direction over the course of the test, as depicted in Table 1, below. This would correspond to a fattening across the width (transverse direction) of about 0.07% (which is about half of the strain in the longitudinal direction). Without being bound to a particular mechanism of theory, it is believed that a collector bar is capable of deforming itself to the cathode (e.g. slot) via the increase in pressure in the inner void and by applying that pressure to deform the bar outward, in a transverse direction to conform the bar to the cathode.

TABLE 1

Measurements for total height change and change in average pin position give total strain during the bench test. Pins were numbered in six vertical pairs.

| | Full Bar Height at Corners | | | |
|---|---|---|---|---|
| | 1-2 Corner | 3-4 Corner | 4-5 Corner | 6-1 Corner |
| Before | 4.634 | 4.608 | 4.596 | 4.623 |
| After | 4.6305 | 4.598 | 4.586 | 4.619 |
| Strain | −0.076% | −0.217% | −0.218% | −0.087% |

| | Pins | | | | | |
|---|---|---|---|---|---|---|
| | Pin 1-1 | Pin 2-2 | Pin 3-3 | Pin 4-4 | Pin 5-5 | Pin 6-6 |
| Outside Before Test | 4.0007 | 3.9998 | 4.0002 | 4.0003 | 3.9996 | 4.0000 |
| Inside Before Test | 3.0030 | 3.0025 | 3.0030 | 3.0040 | 3.0035 | 3.0030 |
| Outside After Test | 3.9985 | 3.9985 | 3.9960 | 3.9980 | 3.9920 | 3.9950 |
| Inside After Test | 3.0020 | 2.9980 | 2.9970 | 3.0000 | 2.9930 | 2.9960 |
| Strain | −0.046% | −0.083% | −0.146% | −0.090% | −0.258% | −0.171% |

Average of all Strains −0.14%

Referring to Table 1, the measurements taken across the width of the block showed fattening (negative strain values refer to a reduction in size in a longitudinal direction, thus an increase in size in a transverse direction).

By extrapolating these results to a larger collector bar (e.g. about 4.25" wide) in an operating cell (as opposed to a furnace at cell operating temperature), the strain is expected to correspond to a deformation of the block in a transverse direction (bar "fattening") of roughly 0.003. This was only about half of the expected 0.07%. Without being bound to a particular mechanism or theory, this may be attributed to "end effects" which refers to the changes occurring at one end of the bar and/or the limited number of measurements.

Without being bound to any mechanism or theory, this amount of deformation in the bar is believed to be sufficient to reduce CVD in an operating pot.

Without being bound to any mechanism or theory, this amount of deformation is believed to be approximately one order of magnitude smaller than the air gap which is expected to be formed over a collector bar's surface due to bar bending during rodding (formation of the cathode collector assembly).

Without being bound to any mechanism or theory, this amount of deformation is also believed to be about one half of the interference fit that makes the difference between no contact and perfect electrical contact in a metal to metal contact in other collector bar applications.

Therefore, while more deformation (from pressure being maintained longer) would result in a greater reduction in CVD, the amount of deformation achieved with this configuration is believed to be sufficient to significantly reduce CVD.

Further, without being bound by any mechanism or theory, the Harper-Dorn dislocation climb suggests that creep rate at temperature is proportional to compressive stress. Given the aforementioned, by integrating the pressure history and incorporating the measured creep, it's possible to provide a relationship for the creep rate:

$$\dot{\varepsilon} = \frac{-1.4 \times 10^{-6}}{psig\ day} \times \sigma$$

While various embodiments of the instant disclosure have been described in detail, it is apparent that modifications and adaptations of those embodiments will occur to those skilled in the art. However, it is to be expressly understood that such modifications and adaptations are within the spirit and scope of the instant disclosure.

REFERENCE NUMERALS 10 cell
12 anode
14 cathode assembly
16 cathode
18 cathode slot
20 current collector subassembly
22 current collector bar
24 sidewall
26 inner void
28 expandable material gas
30 expandable material solid (e.g. phase change)
32 conductive material
34 filler material (non-reactive/non-expansive)
36 metal pad (aluminum metal)
38 compression detector
40 bath
42 lining (refractory lining)
44 anchor/brace
46 interface (e.g. mechanical connection, electrical connection)
48 spacer material (external to bar, e.g. between bars)
50 wall (outer shell)
52 joint material (e.g. between cathode and bar)
54 attached end (e.g. cap on end of collector bar)
56 attachment site (e.g. seal, mechanical connection between portions of the bar)

What is claimed is:

1. An electrolysis cell, comprising:
an anode;
at least one cathode block; and
a current collector bar configured to be at least partially disposed adjacent to and in electrical communication with the cathode block, wherein the current collector bar comprises:
at least one sidewall;
an inner void enclosed by the sidewall; and
an expandable material retained in the inner void via the at least one sidewall, wherein the expandable material is selected from the group consisting of: a gas, an inert gas, a phase change material, $MgCO_3$, $CaCO_3$, a degrading material, and combinations thereof;
further wherein the expandable material is configured to exert pressure on the wall of the inner void while the collector bar is at operating temperature, such that the collector bar is conformed to the cathode block.

2. The electrolysis cell of claim 1, further wherein the expandable material undergoes a phase change at a temperature exceeding 100° C. to evolve a gas.

3. The electrolysis cell of claim 1, wherein the at least one sidewall comprises a seal.

4. The electrolysis cell of claim 3, further wherein the seal comprises a weld, a mechanical fastener, an adhesive, a bolt, a rivet, and combinations thereof.

5. The electrolysis cell of claim 1, wherein the inner void further comprises a conductive material, wherein the conductive material comprises an electrical conductivity which is greater than the at least one sidewall.

6. The electrolysis cell of claim 5, wherein the conductive material comprises a bar, a pipe, a plurality of tabs, a plurality of shot material, and combinations thereof.

7. The electrolysis cell of claim 1, further comprising an anchor in communication with an end of the current collector bar, where the anchor is configured to limit movement of the current collector bar in a longitudinal direction.

8. The electrolysis cell of claim 1, wherein the expandable material is configured to increase the pressure in the inner void by at least 50 psig at cell operating conditions.

9. The electrolysis cell of claim 1, wherein the inner void comprises a pressure of at least 15 PSIG at a temperature of 20-25° C.

10. The electrolysis cell of claim 1, wherein the adjustable current collector bar reduces the cathode voltage drop (CVD) between the cathode and the current collector bar by at least 50 mV.

11. The electrolysis cell of claim 1, wherein the cross-sectional area percentage of the inner void to the collector bar is from 10% to 90%.

12. The electrolysis cell of claim 1, wherein the inner void further comprises a filler material.

13. The electrolysis cell of claim 1, wherein the current collector bar further comprises: a joint material composed of a conductive material, located between and in electrical communication with the cathode and the current collector bar.

14. An electrolysis cell, comprising:
an anode;
at least one cathode block; and
a current collector bar configured to be at least partially disposed adjacent to and in electrical communication with the cathode block, wherein the current collector bar comprises:
at least one sidewall;
an inner void enclosed by the sidewall; and
an expandable material retained in the inner void via the at least one sidewall, wherein the expandable material is selected from the group consisting of:
a phase change material,
a degrading material, and combinations thereof;
wherein the expandable material undergoes a phase change at a temperature exceeding 100° C. to evolve a gas;
further wherein, via the phase change, the expandable material is configured to exert pressure on the wall of the inner void while the collector bar is at operating temperature, such that the collector bar is conformed to the cathode block.

15. The electrolysis cell of claim 14, further wherein the at least one sidewall comprises a seal, wherein the seal is selected from the group consisting of: a weld, a mechanical fastener, an adhesive, a bolt, a rivet, and combinations thereof.

16. The electrolysis cell of claim 14, wherein the inner void further comprises a filler material.

17. An electrolysis cell, comprising:
an anode;
at least one cathode block; and
a current collector bar configured to be at least partially disposed adjacent to and in electrical communication with the cathode block, wherein the current collector bar comprises:
at least one sidewall;
an inner void enclosed by the sidewall, wherein the inner void further comprises a conductive material, wherein the conductive material comprises an electrical conductivity which is greater than the at least one sidewall; and
an expandable material retained in the inner void via the at least one sidewall,
wherein the expandable material is configured to exert pressure on the wall of the inner void while the collector bar is at operating temperature, such that the collector bar is conformed to the cathode block and
wherein the expandable material is selected from the group consisting of: a gas, an inert gas, a phase change material, $MgCO_3$, $CaCO_3$, a degrading material, and combinations thereof.

* * * * *